US012683661B2

(12) United States Patent
Bai et al.

(10) Patent No.: US 12,683,661 B2
(45) Date of Patent: Jul. 14, 2026

(54) CSI-RS INTER-INTRA FREQUENCY MEASUREMENTS

(71) Applicant: QUALCOMM Incorporated, San Diego, CA (US)

(72) Inventors: Tianyang Bai, Somerville, NJ (US); Yan Zhou, San Diego, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 18/358,770

(22) Filed: Jul. 25, 2023

(65) Prior Publication Data

US 2024/0146374 A1      May 2, 2024

Related U.S. Application Data

(60) Provisional application No. 63/381,664, filed on Oct. 31, 2022.

(51) Int. Cl.
| | |
|---|---|
| *H04W 36/00* | (2009.01) |
| *H04B 7/06* | (2006.01) |
| *H04L 27/26* | (2006.01) |

(52) U.S. Cl.
CPC ....... *H04B 7/0626* (2013.01); *H04L 27/2657* (2013.01); *H04W 36/0088* (2013.01)

(58) Field of Classification Search
CPC ........... H04W 36/0088; H04L 27/2657; H04B 7/0626
See application file for complete search history.

(56) References Cited

U.S. PATENT DOCUMENTS

| | | | | |
|---|---|---|---|---|
| 12,356,232 | B2 * | 7/2025 | Xie ................. | H04W 36/0088 |
| 2019/0074886 | A1 * | 3/2019 | Yoon ................... | H04B 7/0617 |

(Continued)

FOREIGN PATENT DOCUMENTS

| | | |
|---|---|---|
| WO | 2020092732 A1 | 5/2020 |
| WO | 2022021944 A1 | 2/2022 |

OTHER PUBLICATIONS

3GPP TS 38.133: "3rd Generation Partnership Project, Technical Specification Group Radio Access Network, NR, Requirements for support of radio resource management (Release 17)", Technical Specification, 3rd Generation Partnership Project, Mobile Competence Centre, 650, Route Des Lucioles, F-06921 Sophia-Antipolis Cedex, France, vol. RAN WG4, No. V17.7.0, Sep. 2022, Oct. 5, 2022, pp. 111-993, 5191 Pages, XP052211449, Section 9.1.2.1 Section 9.1.2.1c.

(Continued)

*Primary Examiner* — Kent Krueger
(74) *Attorney, Agent, or Firm* — Procopio, Cory, Hargreaves & Savitch LLP

(57)      ABSTRACT

A method of wireless communication at a UE is disclosed herein. The method includes receiving a configuration to perform an inter-frequency measurement of at least one of a SSB or a CSI-RS of a candidate cell while connected to a serving cell. The method includes performing the inter-frequency measurement on the at least one of the SSB or the CSI-RS from the candidate cell based on the received configuration. The method includes outputting an indication of the performed inter-frequency measurement.

26 Claims, 14 Drawing Sheets

(56)     References Cited

U.S. PATENT DOCUMENTS

| | | | |
|---|---|---|---|
| 2019/0182000 A1* | 6/2019 | Futaki | H04L 1/0693 |
| 2020/0107337 A1* | 4/2020 | Lin | H04L 1/0026 |
| 2020/0344019 A1* | 10/2020 | Da Silva | H04W 24/04 |
| 2021/0068000 A1* | 3/2021 | Tao | H04L 5/0048 |
| 2021/0083730 A1* | 3/2021 | Hwang | H04B 7/0408 |
| 2021/0368374 A1* | 11/2021 | Cheng | H04W 80/02 |
| 2022/0104059 A1* | 3/2022 | Hu | H04W 24/02 |
| 2023/0047684 A1* | 2/2023 | Hu | H04W 24/02 |
| 2024/0155441 A1* | 5/2024 | Bai | H04L 5/005 |

OTHER PUBLICATIONS

International Search Report and Written Opinion—PCT/US2023/033073—ISA/EPO—Jan. 19, 2024.

* cited by examiner

404

UE

404d

404a

404b

404c

402e

402d

402f

402c

402g

402b

402h

402a

402

400

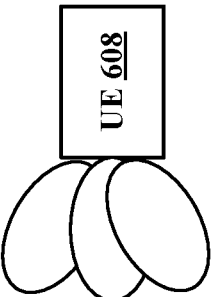
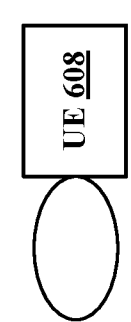
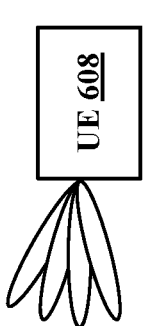
UE 608
UE 608
UE 608
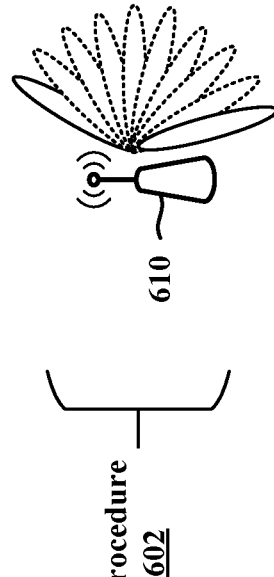
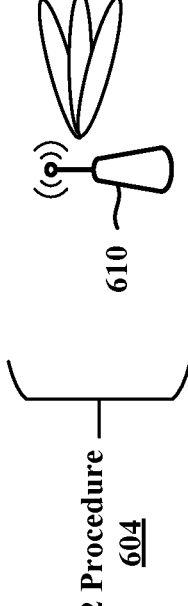
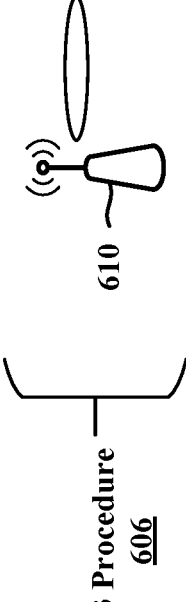
610
610
610
P1 Procedure 602
P2 Procedure 604
P3 Procedure 606
600
FIG. 6

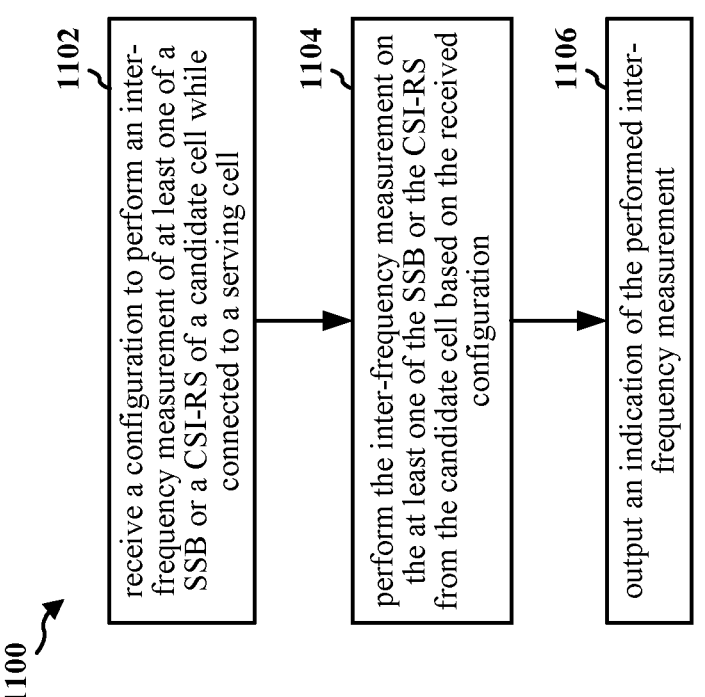

1100

1102 receive a configuration to perform an inter-frequency measurement of at least one of a SSB or a CSI-RS of a candidate cell while connected to a serving cell

1104 perform the inter-frequency measurement on the at least one of the SSB or the CSI-RS from the candidate cell based on the received configuration

1106 output an indication of the performed inter-frequency measurement

FIG. 11

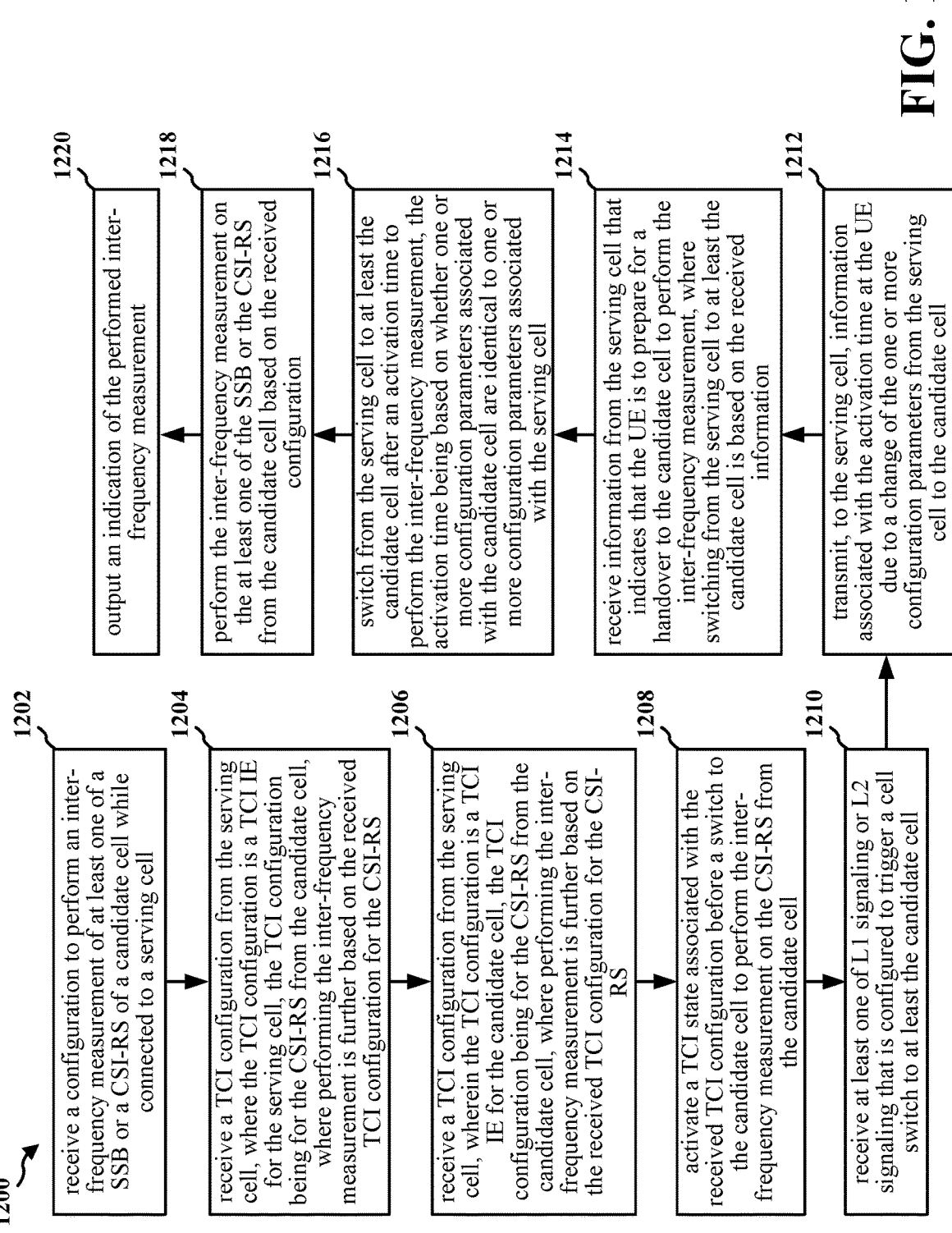

FIG. 12

1202 receive a configuration to perform an inter-frequency measurement of at least one of a SSB or a CSI-RS of a candidate cell while connected to a serving cell 1204 receive a TCI configuration from the serving cell, where the TCI configuration is a TCI IE for the serving cell, the TCI configuration being for the CSI-RS from the candidate cell, where performing the inter-frequency measurement is further based on the received TCI configuration for the CSI-RS 1206 receive a TCI configuration from the serving cell, wherein the TCI configuration is a TCI IE for the candidate cell, the TCI configuration being for the CSI-RS from the candidate cell, where performing the inter-frequency measurement is further based on the received TCI configuration for the CSI-RS 1208 activate a TCI state associated with the received TCI configuration before a switch to the candidate cell to perform the inter-frequency measurement on the CSI-RS from the candidate cell 1210 receive at least one of L1 signaling or L2 signaling that is configured to trigger a cell switch to at least the candidate cell 1212 transmit, to the serving cell, information associated with the activation time at the UE due to a change of the one or more configuration parameters from the serving cell to the candidate cell 1214 receive information from the serving cell that indicates that the UE is to prepare for a handover to the candidate cell to perform the inter-frequency measurement, where switching from the serving cell to at least the candidate cell is based on the received information 1216 switch from the serving cell to at least the candidate cell after an activation time to perform the inter-frequency measurement, the activation time being based on whether one or more configuration parameters associated with the candidate cell are identical to one or more configuration parameters associated with the serving cell 1218 perform the inter-frequency measurement on the at least one of the SSB or the CSI-RS from the candidate cell based on the received configuration 1220 output an indication of the performed inter-frequency measurement

1200

CSI-RS INTER-INTRA FREQUENCY MEASUREMENTS

CROSS REFERENCE TO RELATED APPLICATION(S)

This application claims the benefit of and priority to U.S. Provisional Application Ser. No. 63/381,664, entitled "CSI-RS INTER-INTRA FREQUENCY MEASUREMENTS" and filed on Oct. 31, 2022, which is expressly incorporated by reference herein in its entirety.

TECHNICAL FIELD

The present disclosure relates generally to communication systems, and more particularly, to reference signal measurements.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes at least one memory and at least one processor coupled to the at least one memory and, based at least in part on information stored in the at least one memory, the at least one processor, individually or in any combination, is configured to: receive a configuration to perform an inter-frequency measurement of at least one of a synchronization signal block (SSB) or a channel state information (CSI) reference signal (RS) (CSI-RS) of a candidate cell while connected to a serving cell; perform the inter-frequency measurement on the at least one of the SSB or the CSI-RS from the candidate cell based on the received configuration; and output an indication of the performed inter-frequency measurement.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a diagram illustrating examples of bean refinement procedures.

FIG. 11 is a flowchart of a method of wireless communication.

FIG. 12 is a flowchart of a method of wireless communication.

DETAILED DESCRIPTION

Figure 1:
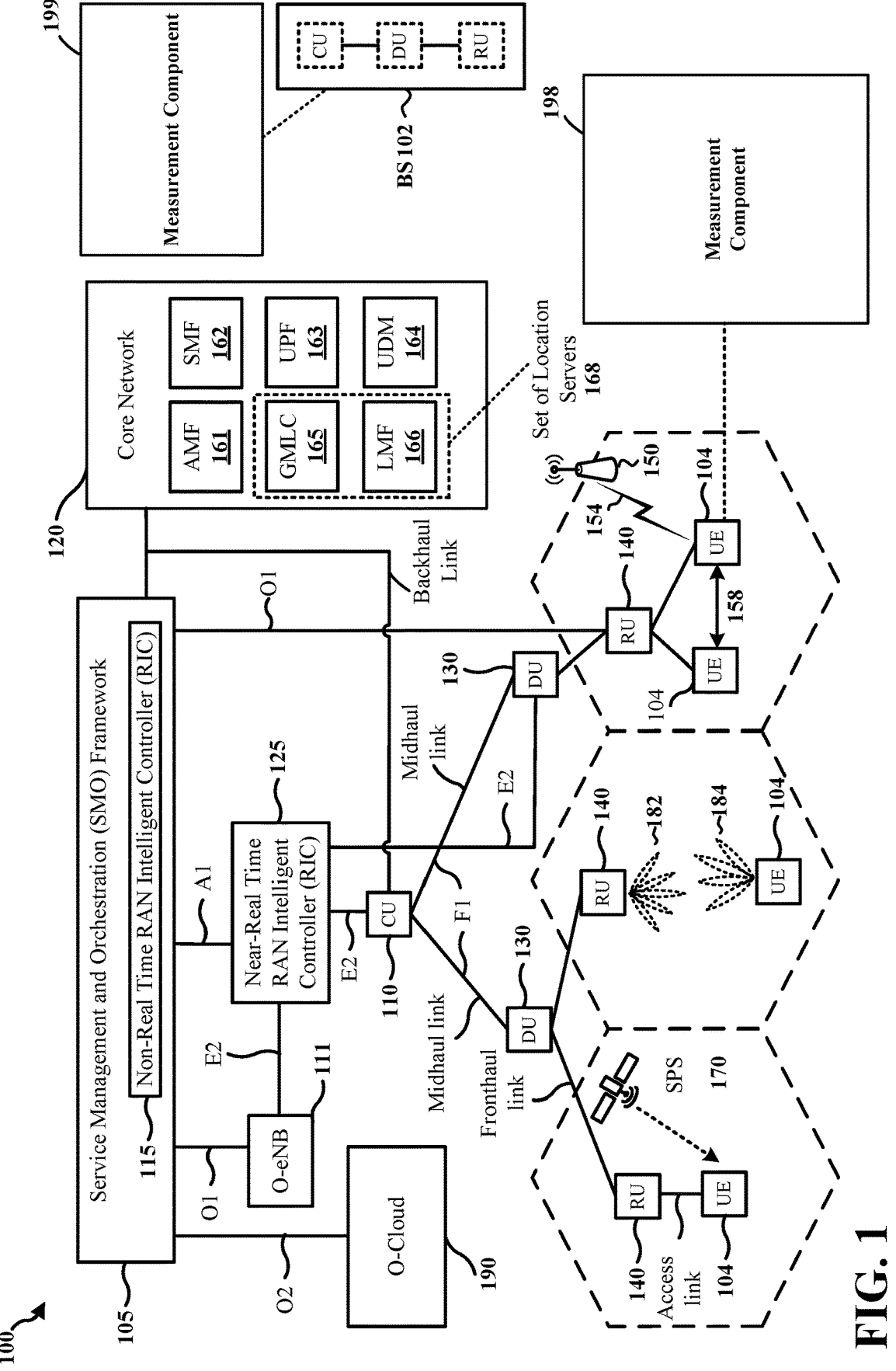
FIG. 1 is a diagram illustrating an example of a wireless communications system and an access network.

A UE may be connected to a serving cell in order to communicate via a wireless communication network. As the UE moves about an environment, the UE may change serving cells (i.e., change from a serving cell to a candidate cell) in order to maintain communications reliability. In order to determine when to switch to the candidate cell (and/or to adjust parameters of the UE with respect to the candidate cell), the UE may perform measurements on a reference signal (e.g., a synchronization signal block (SSB) or a channel state information reference signal (CSI-RS)) associated with the candidate cell. When the UE performs intra-frequency measurements, the UE may reuse a CSI-RS configuration from the serving cell. However, when the UE performs inter-frequency measurements, the UE may not reuse the CSI-RS configuration due to the serving cell and the non-serving cell being associated with different frequencies.

Various technologies pertaining to inter-frequency measurements are described herein. In an example, a UE receives a configuration to perform an inter-frequency measurement of at least one of a SSB or a CSI-RS of a candidate cell while connected to a serving cell. The UE performs the inter-frequency measurement on the at least one of the SSB or the CSI-RS from the candidate cell based on the received configuration. The UE outputs an indication of the performed inter-frequency measurement. Vis-à-vis the aforementioned configuration and inter-frequency measurement, the UE may be able to connect to the candidate cell. Furthermore, the aforementioned configuration and inter-frequency measurement may facilitate adaptation of various parameters pertaining to the UE and the candidate cell. Thus, the aforementioned technologies may provide for increased communications reliability at the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface).

Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other.

Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a measurement component 198 that is configured to receive a configuration to perform an inter-frequency measurement of at least one of a SSB or a channel state information CSI-RS of a candidate cell while connected to a serving cell; perform the inter-frequency measurement on the at least one of the SSB or the CSI-RS from the candidate cell based on the received configuration; and output an indication of the performed inter-frequency measurement. Although the following description may be focused on 5G NR, the concepts described herein may be applicable to other similar areas, such as LTE, LTE-A, CDMA, GSM, and other wireless technologies.

Figures 2A, 2B, 2C, 2D:
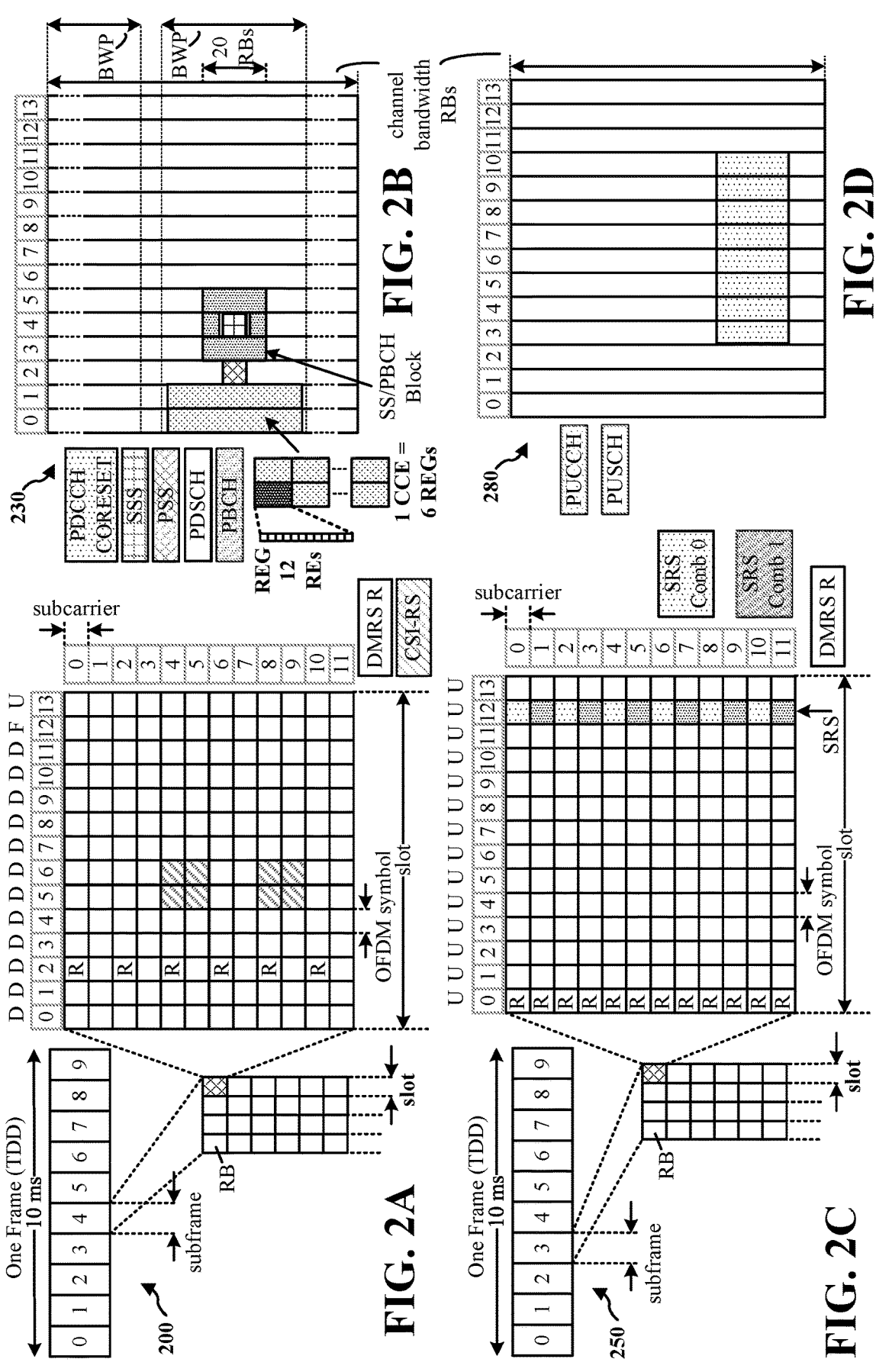
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15 [kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
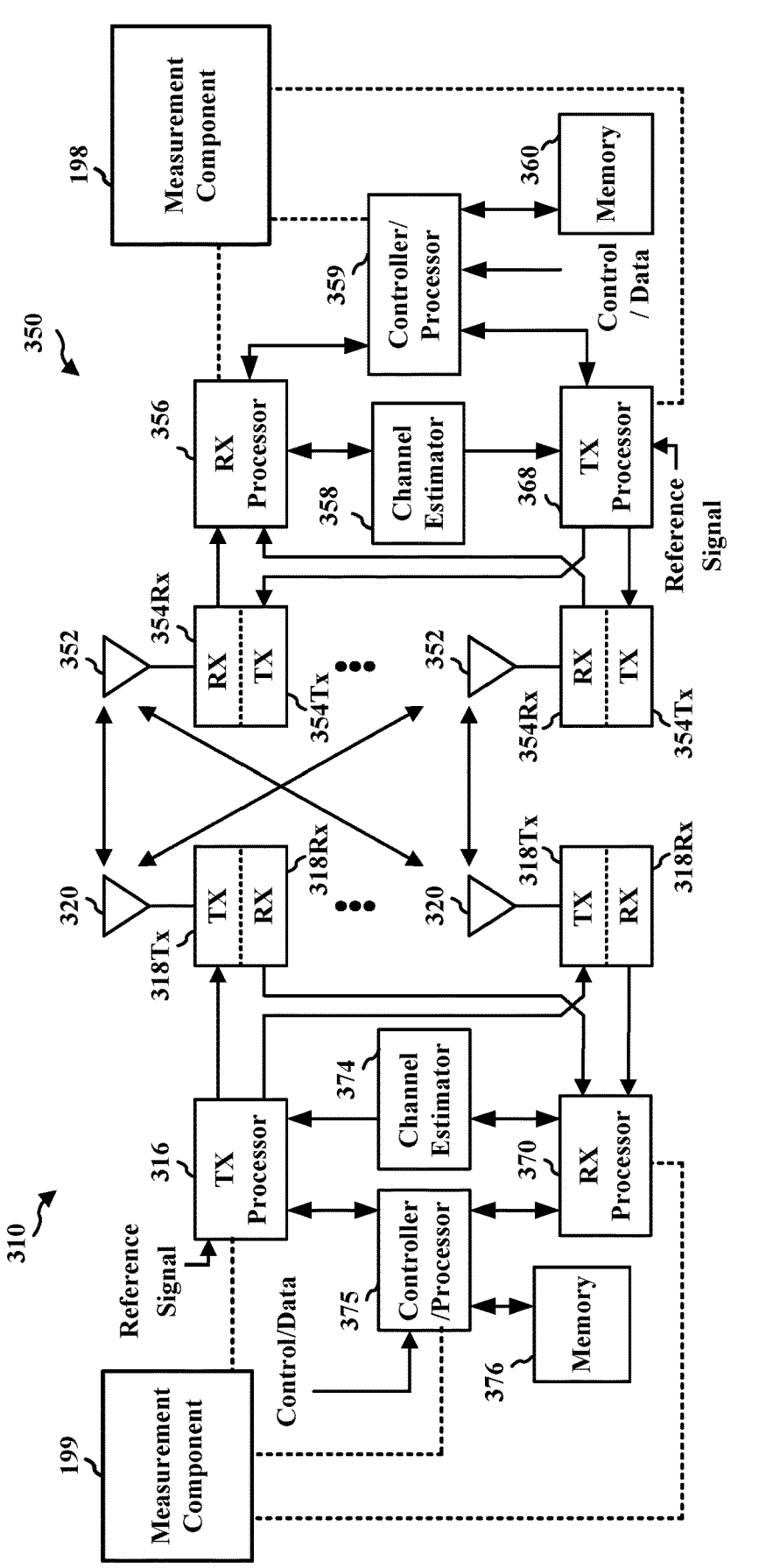
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 (L3) and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement component 198 of FIG. 1.

Figure 4:
FIG. 4 is a diagram illustrating example communications between a base station and a UE for beamforming, in accordance with various aspects of the present disclosure.

As described in connection with example 400 in FIG. 4, the base station 402 and UE 404 may communicate over active data/control beams both for DL communication and UL communication. The base station and/or UE may switch to a new beam direction using beam failure recovery procedures. Referring to FIG. 4, the base station 402 may transmit a beamformed signal to the UE 404 in one or more of the directions 402*a*, 402*b*, 402*c*, 402*d*, 402*e*, 402*f*, 402*g*, 402*h*. The UE 404 may receive the beamformed signal from the base station 402 in one or more receive directions 404*a*, 404*b*, 404*c*, 404*d*. The UE 404 may also transmit a beamformed signal to the base station 402 in one or more of the directions 404*a*-404*d*. The base station 402 may receive the beamformed signal from the UE 404 in one or more of the receive directions 402*a*-402*h*. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 402*a*-402*h*. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

A TCI state may include quasi-co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

Figure 5:
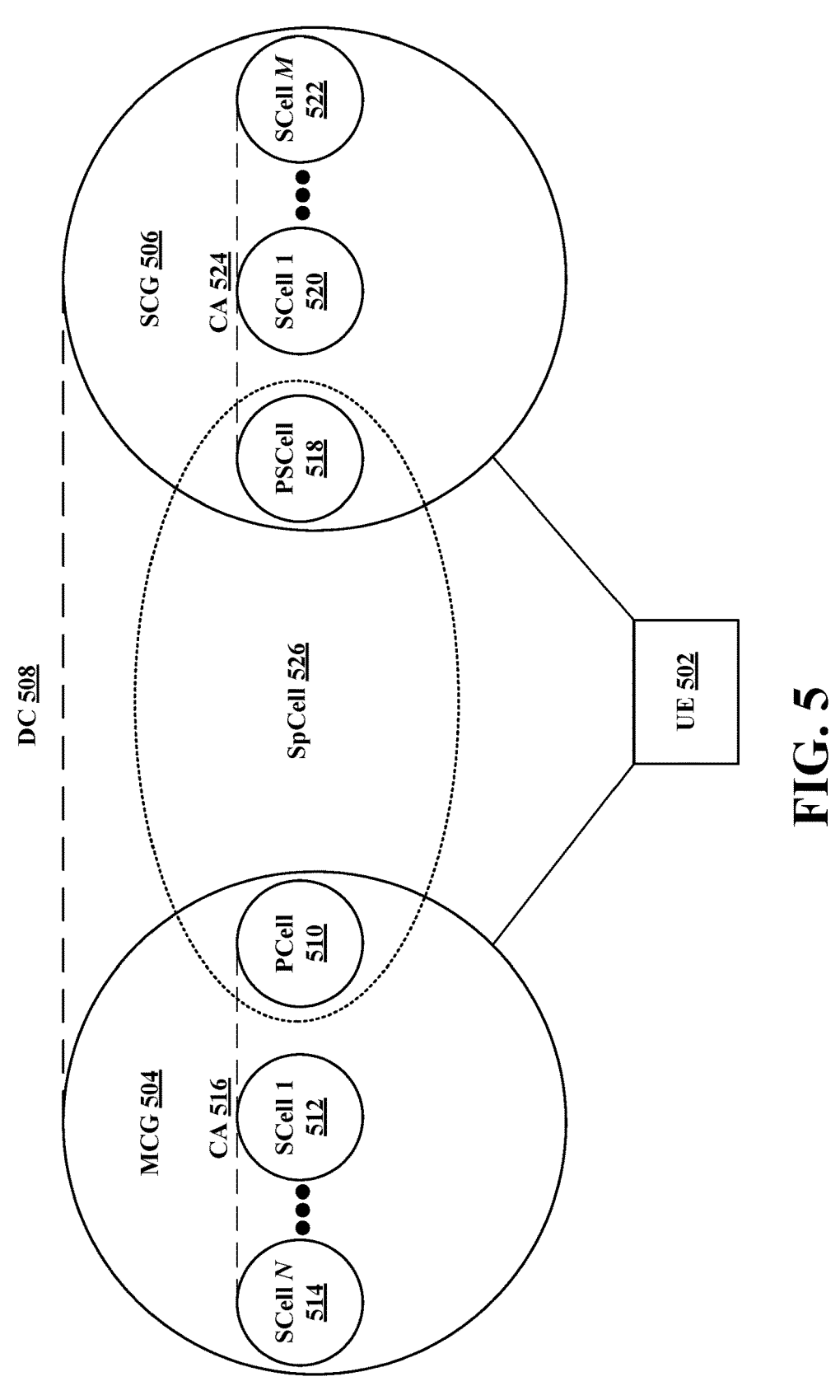
FIG. 5 is a diagram illustrating example cell designations.

FIG. 5 is a diagram 500 that illustrates an example of dual connectivity and carrier aggregation (CA). A UE 502 may be connected to a master cell group (MCG) 504 and a secondary cell group (SCG) 506. Such an arrangement may be referred to as dual connectivity (DC) 508. The MCG 504 may be a group of serving cells associated with a master node that has a control plane connection to a core network (e.g., the core network 120). The master node may be a base station such as a gNB, an eNB, etc. (i.e., a network entity). The SCG 506 may be a group of serving cells associated with a secondary node that does not have a control plane connection to the core network. The secondary node may be a base station, such as a gNB, an eNB, etc. (i.e., a network entity). The MCG 504 may become the SCG 506 and the SCG 506 may become the MCG 504 based upon various factors, such as a location of the UE 502, network conditions, etc.

The MCG 504 includes a PCell 510. The MCG 504 may also include one or more SCells (e.g., a first SCell 512 and an Nth SCell 514, where N is a positive integer greater than one). The PCell 510, the first SCell 512, and/or the Nth SCell 514 may be in a CA 516 configuration. In some aspects, a primary cell may become a secondary cell or that a secondary cell may become a primary cell based upon various factors, such as a location of the UE 502, network conditions, etc.

The SCG 506 may include a primary secondary cell (PSCell) 518. The PSCell 518 may be a primary cell of the SCG 506. The SCG 506 may also include one or more SCells (e.g., a first SCell 520 and an Mth SCell 522, where M is a positive integer greater than one). The PSCell 518, the first SCell 520, and/or the Mth SCell 522 may be in a CA configuration 524. In some aspects, a primary secondary cell may become a secondary cell or that a secondary cell may become a primary secondary cell based upon various factors, such as a location of the UE 502, network conditions, etc.

The PCell 510 of the MCG 504 and the PSCell 518 of the SCG 506 may be referred to as a special cell (SpCell) 526. For Dual Connectivity operation the term SpCell may refer to the PCell of the MCG or the PSCell of the SCG, e.g., depending on whether the MAC entity is associated to the MCG or the SCG, respectively. An SpCell may support PUCCH transmission and contention-based random access, and may be in an activated state. The SpCell 526 may be responsible for data and control functionality. In cases in which there is no DC (e.g., when the MCG 504 is configured and when the SCG 506 is not configured), the PCell 510 may be referred to as the SpCell 526. A cell group that includes the SpCell 526 may be referred to as a PCG. It is to be understood that an SpCell may change based upon various factors, such as a location of the UE 502, network conditions, etc. In an example, a network entity may configure the first SCell 512 as a primary cell and Mth SCell 522 as a primary secondary cell to configure a new SpCell.

FIG. 6 is a diagram 600 illustrating examples of a P1 beam refinement procedure 602, a P2 beam refinement procedure 604, and a P3 beam refinement procedure 606. In general, the P1 beam refinement procedure 602, the P2 beam refinement procedure 604, and the P3 beam refinement procedure 606 may facilitate beam management while a UE 608 is in a connected state with a base station 610 (e.g., a gNB). The P1 beam refinement procedure 602, the P2 beam refinement procedure 604, and the P3 beam refinement procedure 606 may be related to DL beam management. The P1 beam refinement procedure 602, the P2 beam refinement procedure 604, and the P3 beam refinement procedure 606 may be respectively referred to as a P1 procedure, a P2 procedure, and a P3 procedure.

In general, the P1 beam refinement procedure 602 may relate to beam selection. The P1 beam refinement procedure 602 may enable the UE 608 to measure different Tx beams of the base station 610 (illustrated as ovals in the diagram 600) to support a selection of one or more of the Tx beams of the base station 610 and/or one or more Rx beams of the UE 608. For beamforming at the UE 608, the P1 beam refinement procedure 602 may include a UE Rx beam sweep from a set of different beams. The P1 beam refinement procedure 602 may involve selecting a SSB having a strongest RSRP measurement (e.g., a L1-RSRP measurement), where the SSB may be associated with a Tx beam and/or a Rx beam. The UE 608 and the base station 610 may track RSRP measurements via RSRP reporting by the UE 608 to the base station 610.

In general, the P2 beam refinement procedure 604 may relate to beam refinement for a transmitter (e.g., the base station 610). The P2 beam refinement procedure 604 may be used to enable UE measurement on different TRP Tx beams in order to potentially change one or more inter/intra-TRP Tx beams. A smaller set of beams may be utilized in the P2 beam refinement procedure 604 compared to a set of beams utilized in the P1 beam refinement procedure 602. The P2 beam refinement procedure 604 may involve aperiodic CSI-RS/SSB measurements that are communicated via DCI. In an example, the base station 610 may sweep CSI-RS s through a set of candidate beams. The UE 608 may measure a strongest CSI-RS RSRP measurement (e.g., a L1-RSRP measurement). The UE 608 may report the strongest CSI-RS RSRP measurement (from amongst many CSI-RS RSRP measurements) to the base station 610. The base station 610 may fix a beam based on the strongest CSI-RS RSRP measurement.

In general, the P3 beam refinement procedure 606 may relate to beam refinement at a receiver (e.g., the UE 608). The P3 beam refinement procedure 606 may enable the UE 608 to measure a Tx beam of the base station 610 in order for the UE 608 to change a Rx beam if the UE 608 is configured with beamforming functionality. The P3 beam refinement procedure 606 may establish an optimal UE Rx beam using aperiodic CSI-RS s. The P3 beam refinement procedure 606 may involve the base station 610 fixing a Tx beam and indicating QCL information to the UE 608. CSI-RS resources in a slot may have a same beam configuration on the base station 610. The UE 608 may perform RSRP measurements (e.g., L1-RSRP measurements) on CSI-RSs and the UE 608 may select an optimal Rx beam based on the RSRP measurements.

In a wireless communication system, a network may aim to ensure that a UE maintains connectivity with a network entity (e.g., a base station) as the UE moves within the network. Layer 1 (L1)/layer 2 (L2) inter-cell mobility may refer to changing a cell (e.g., a PCell or an SCell) or a cell group that a UE communicates with/over based on the UE receiving L1/L2 signaling. L1 signaling may include DCI signaling (i.e., a DCI) and L2 signaling may include medium access control (MAC) control element (MAC-CE) signaling (i.e., a MAC-CE). In an example, the L1/L2 signaling may specify a serving cell change for a UE. L1/L2 based inter-cell mobility may help to reduce mobility latency. For instance, configuration and maintenance of multiple candidate cells may allow for rapid application of configurations for candidate cells. Furthermore, dynamic switching mechanisms among candidate serving cells (including an SpCell and SCell) based on L1/L2 signaling may further reduce latency.

L1/L2 based inter-cell mobility may be applicable to standalone operation scenarios, CA scenarios, and DC (e.g., NR-DC) scenarios. In the standalone operation scenarios and CA scenarios, L1/L2 based inter-cell mobility may be applicable for intra-DU cases and/or intra-CU and inter-DU cases. CU-DU interface signaling may support L1/L2 based inter-cell mobility. L1/L2 based inter-cell mobility may be applicable in both FR1 and FR2, as well as both in intra-frequency and inter-frequency. In L1/L2 based inter-cell mobility, source cells and target cells may be synchronized or non-synchronized. L1/L2 based inter-cell mobility may be associated with enhancements to timing advance management. L1/L2 based inter-cell mobility may also be associated with enhancements to inter-cell beam management, including L1 measurement, L1 reporting, and beam indication.

Figure 7:
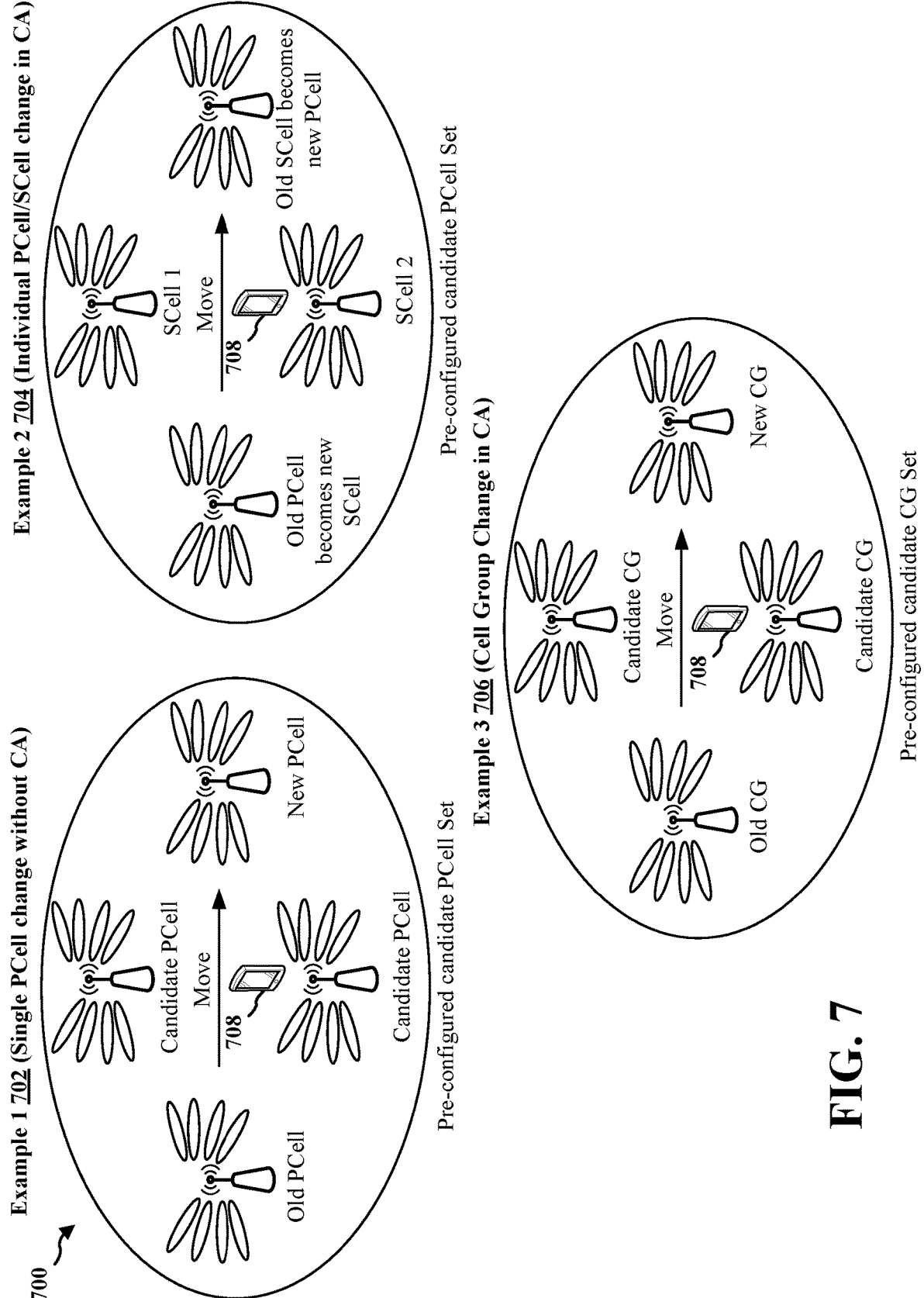
FIG. 7 is a diagram illustrating various aspects of layer 1 (L1)/layer 2 (L2) inter-cell mobility.

FIG. 7 is a diagram 700 illustrating various aspects of L1/L2 inter-cell mobility. The diagram 700 illustrates a first example 702, a second example 704, and a third example 706. The first example 702 and the second example 704 may pertain to a first class of L1/L2 mobility associated with individual cell selection. The first class may pertain to beam indication based PCell selection. The third example 706 may pertain to a second class of L1/L2 mobility associated with cell group (CG) based selection.

The first example 702 may pertain to a single PCell change without CA. In the first example 702, a UE 708 may receive first signaling that causes the UE 708 to switch from a first PCell (e.g., "the Old PCell") to a second PCell (e.g., "the New PCell"). For instance, in the first example 702, a single PCell (e.g., "the New PCell") that is not in a CA or DC configuration may be selected from a pre-configured candidate PCell set. The first signaling may be L1 or L2 signaling. L1 signaling may include DCI signaling (i.e., a DCI) and L2 signaling may include medium access control (MAC) control element (MAC-CE) signaling (i.e., a MAC-CE). The first signaling may also be L3 signaling (e.g., RRC based signaling). The UE 708 may receive the first signaling based on movement of the UE 708 throughout an environment.

The second example 704 may pertain to a PCell change via a PCell-SCell swap from a pre-configured candidate PCell set. In the second example 704, the UE 708 may receive second signaling that causes the UE 708 to swap the "Old PCell" with the "Old SCell" such that the "Old PCell" becomes the "New SCell" and the "Old SCell" becomes the "New PCell." The second signaling may be L1 or L2 signaling. L1 signaling may include DCI signaling (i.e., a DCI) and L2 signaling may include MAC-CE signaling (i.e., a MAC-CE). The second signaling may also be L3 signaling (e.g., RRC based signaling). The second signaling may be separate (i.e., different) from the first signaling described above with respect to the first example 702. The UE 708 may receive the second signaling based on movement of the UE 708 throughout the environment.

The third example 706 may pertain to a SpCell and an SCell being switched together in a CA configuration. In the third example 706, the UE 708 may receive CG switch signaling that causes the UE 708 to switch from a first CG (e.g., "the Old CG") to a second CG (e.g., "the New CG"). Stated differently, the second CG may be selected from amongst a pre-configured candidate CG set. The CG switch signaling may be an extension of the first signaling and/or the second signaling described above. For instance, the CG switch signaling may be L1 signaling, L2 signaling, or L3 signaling. The UE 708 may receive the CG switch signaling based on movement of the UE 708 throughout the environment.

Figure 8:
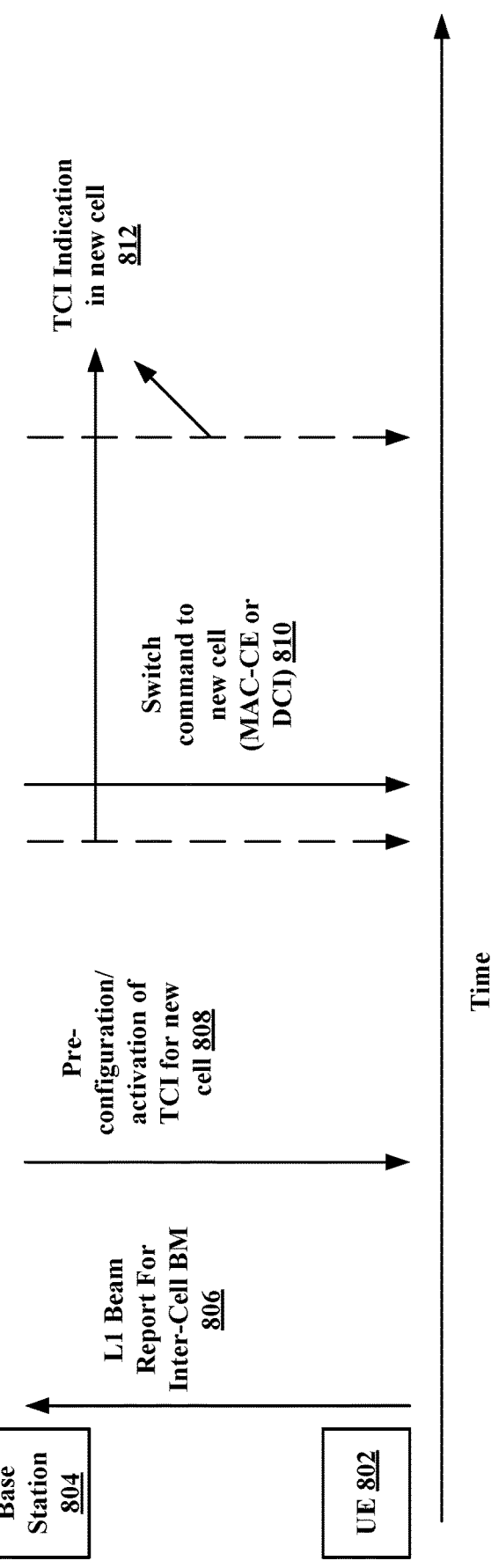
FIG. 8 is a diagram illustrating example aspects of a timeline associated with a transmission configuration indicator (TCI) configuration.

FIG. 8 is a diagram 800 illustrating example aspects of a timeline associated with a TCI configuration. At 806, a UE 802 may transmit a L1 beam report for inter-cell beam management to a base station 804. At 808, the UE 802 may receive a pre-configuration/activation of a TCI state for a new cell (e.g., a candidate cell). At 810, the UE 802 may receive a switch command from the base station 804, where the switch command may indicate that the UE 802 is to switch from a serving cell to the candidate cell. The switch command may be a MAC-CE or a DCI. At 812, the UE 802 may receive a TCI indication for the new cell. In one aspect, the TCI indication received by the UE 802 at 812 may be associated with a TCI list that may be pre-configured on a per-cell basis before the UE 802 switches to the new cell. For instance, a network may know TCI states that are associated with reliable communications for the UE 802 based on an inter-cell beam management procedure performed with respect to the UE 802. In another aspect, the TCI indication for the new cell may be received before, concurrently with, or after the UE 802 receives the switch command. For instance, the UE 802 may receive the TCI indication at 808, 810, or 812.

To minimize cell switch latency, L1 measurement procedures for a candidate cell may be performed before switching to the candidate cell. For instance, a DL Rx timing acquisition associated with a candidate cell may be achieved by measuring an earliest arrival time of SSBs from the candidate cell. A UE may be configured to memorize measurement results associated with candidate cells and to apply a communication configuration based on the measurement results after switching to the corresponding candidate cell. As the UE may have limited capability on a maximum number of measurement results associated with the candidate cells that may be memorized, e.g., DL Rx timing, the UE may report its capability as to a maximum number of candidate cells for which measurement results may be memorized. Accordingly, a base station (e.g., a gNB) may indicate a subset of promising candidate cell(s) for the UE to memorize the corresponding DL Rx timing(s), based on the capability that the UE reports.

In one aspect, a network may configure a UE to report its measurements associated with a candidate cell in a CSI report. The configuration or activation signaling of the CSI report may be sent to the UE before or along with a cell switch command that triggers the cell switch to the candidate cell.

In one aspect, the network may activate or indicate TCI states for both serving and non-serving cells (i.e., a cell with a different PCI from the serving cell) before or along with the cell switch command. In some aspects, the cell switch command may be L1 or L2 signaling, and the target candidate cell of the cell switch command can be a cell enabled with inter-cell beam management or inter-cell multiple TRP mode. In some aspects, the network may activate or indicate TCIs associated with different PCIs in one signaling instance, and indicate the PCIs associated with each of the activated or indicated TCIs.

In one aspect, after a cell switch, an active BWP of a new serving cell may be indicated in a cell switch command, which may be a MAC-CE or DCI signaling. The cell switch command may indicate an active UL and/or DL BWP identifier (ID) for the new serving cell, along with other operation parameters for the new serving cell, e.g., timing advance, power control parameters, and/or TCI states. Alternatively, operation configuration parameters including the active DL/UL BWP ID may be indicated in a separate signaling from the cell switch command. For instance, in RRC signaling, the UE may be configured with a default BWP ID to use for each candidate cell. In one aspect, the active BWP of the new serving cell may be determined based on a rule. For instance, a default DL/UL BWP may be applied in the new serving cell after the cell switch. The default BWP can be the initial DL/UL BWP of the serving cell or the BWP with a lowest or a highest BWP ID amongst all configured BWPs in the new serving cell.

As noted above, a UE may perform intra-frequency measurements or inter-frequency measurements on a SSB/ CSI-RS for a candidate cell depending on whether the candidate cell is associated with the same frequency as a serving cell of the UE or a different frequency as the serving cell of the UE. An intra-frequency measurement may be a L3 (e.g., RRC based) intra-frequency measurement and an inter-frequency measurement may be a L3 (e.g., RRC based) inter-frequency measurement. A L3 measurement may be defined as a L3 intra-frequency measurement if (1) the measurement is performed on a SSB and a center frequency of the SSB of the serving cell indicated for measurement and a center frequency of a SSB of a neighbor cell are the same and (2) the SCS of the SSB of the serving cell and the SCS of the SSB of the neighbor cell are the same. The SSB may not be in an active BWP of the serving cell. Furthermore, the aforementioned definition may be extended to include measurements performed on CSI-RSs. A L3 measurement may be defined as a L3 inter-frequency measurement if the L3 measurement is not defined as a L3 intra-frequency measurement. For instance, a L3 measurement may be a L3 inter-frequency measurement if a center frequency or a SCS of a SSB of the neighbor cell (i.e., a candidate cell) is different from a center frequency or a SCS of a SSB of the serving cell.

Intra-frequency measurements and inter-frequency measurements may also be L1 intra-frequency measurements and L1 inter-frequency measurements, respectively. In one aspect, a L1 intra-frequency measurement may be performed with respect to an active BWP of a serving cell. A L1 intra-frequency measurement may pertain to inter-cell beam management procedures. For instance, a UE may be configured in a serving cell configuration with a CSI-RS associated with a TCI state that is quasi-co-located (QCLed) with a non-serving cell SSB. The non-serving cell CSI-RS may be in an active BWP of the non-serving cell. In one aspect, the non-serving cell CSI-RS may be configured in the serving cell such that the non-serving cell CSI-RS has the same scrambling seed, the same aligned Point A configuration, the same SCS, the same aligned center frequency, and the same system frame number (SFN) of a CSI-RS of the serving cell.

L1 intra-frequency measurements may be characterized in different manners. In a first aspect, a non-serving cell CSI-RS may be configured in an active DL BWP and the CSI-RS may follow a serving cell configuration. In a second aspect, the non-serving cell CSI-RS may be configured in an active DL BWP and at least some portion of the configuration may not be the same as a configuration of a serving cell CSI-RS. For instance, a SCS and center frequency of a CSI-RS of the non-serving cell may be the same as the SCS and the center frequency of the CSI-RS of the serving cell, but the scrambling seed sequence of the CSI-RS of the non-serving cell may be different from a scrambling seed sequence of the CSI-RS of the serving cell. In a third aspect, the non-serving cell CSI-RS for intra-frequency measurement may share the same center frequency and SCS of the CSI-RS of the serving cell and the non-serving cell CSI-RS may be in the same BWP as the CSI-RS of the serving cell. In the third aspect, other configurations of the non-serving cell may or may not be the same as the serving cell.

Figure 9:
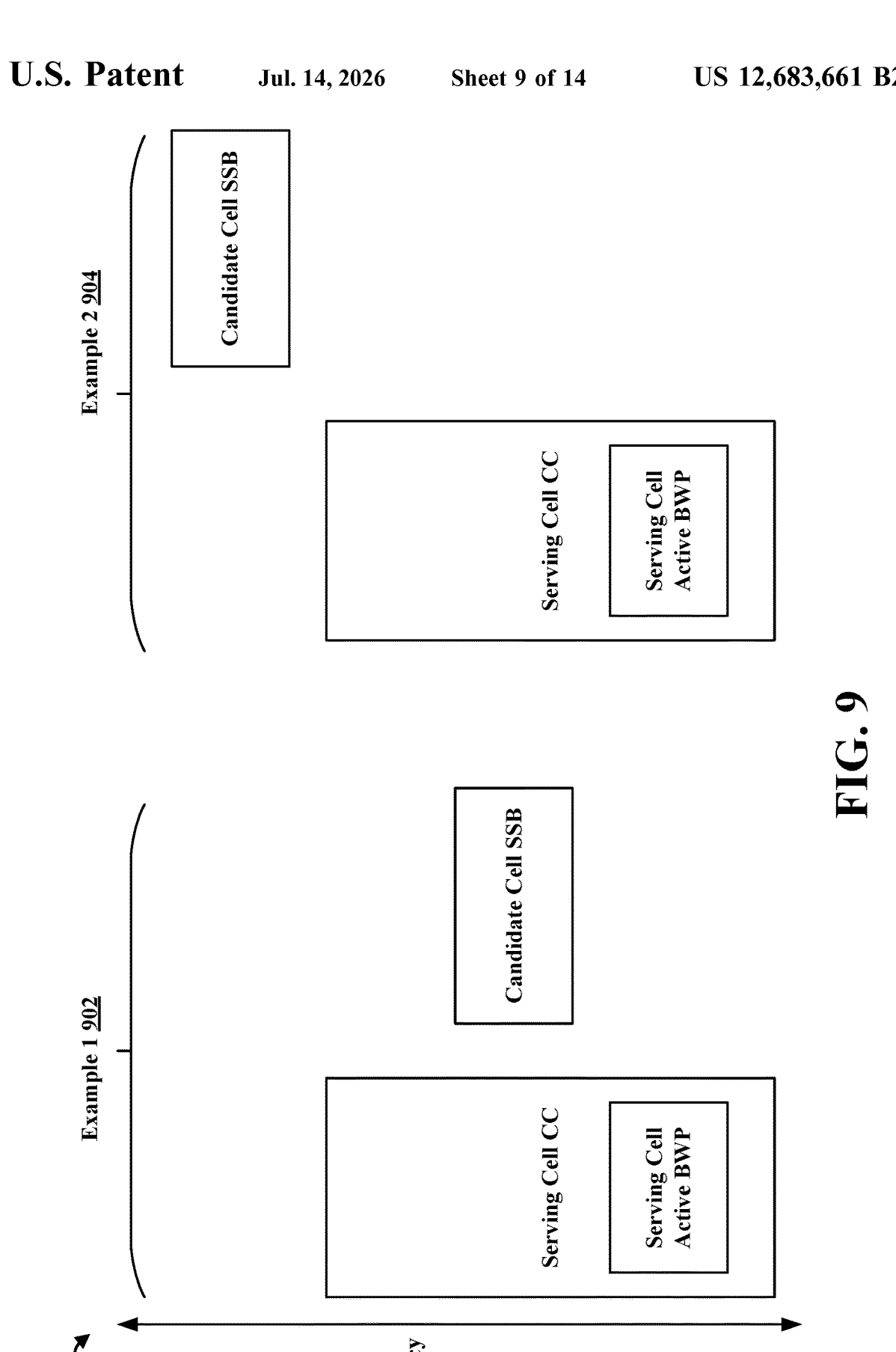
FIG. 9 is a diagram illustrating example aspects pertaining to inter-frequency measurements.

FIG. 9 is a diagram 900 illustrating example aspects pertaining to inter-frequency measurements. A L1 inter-frequency measurement may be a L1 measurement that is not characterized as a L1 intra-frequency measurement (e.g., as described above). The diagram 900 depicts a first example 902 and a second example 904 of aspects pertaining to L1 inter-frequency measurements. In the first example 902, a frequency of a measured referenced signal (e.g., a candidate SSB) may not be covered by active BWPs of a SpCell and/or SCells configured for a UE, but the frequency of the measured RS may be covered by some of the configured BWPs of the SpCell and/or SCells configured for the UE. For instance, in the first example 902, a candidate cell SSB may be within a frequency range covered by a serving cell CC, but not within the active BWP of the serving cell. In the second example 904, a frequency of a measured referenced signal (e.g., a candidate SSB) may not be covered by the configured BWP(s) of the SpCell and/or the SCells configured for the UE. For instance, in the second example 904, a candidate cell SSB may not be within the frequency range covered by the serving cell CC.

As noted above, a UE may be connected to a serving cell in order to communicate via a wireless communication network. As the UE moves about an environment, the UE may change serving cells (i.e., change from a serving cell to a candidate cell) in order to maintain communications reliability. In order to determine when to switch to the candidate cell (and/or to adjust parameters of the UE with respect to the candidate cell), the UE may perform measurements on a reference signal (e.g., a SSB or a CSI-RS) associated with the candidate cell. A UE may be configured in a serving cell configuration with a CSI-RS from a non-serving cell (i.e., the candidate cell) TCI state in order to perform intra-frequency measurements of the non-serving cell. For instance, although the CSI-RS may be configured in the serving cell, the configuration can be implicitly used for non-serving cell intra-frequency measurements. In order for the UE to perform intra-frequency measurements on the non-serving cell CSI-RS, the non-serving cell CSI-RS may have the same scrambling seed, the same aligned point A configuration, the same SCS, the same aligned center frequency, and the same SFN offset as the serving cell CSI-RS. When the UE performs intra-frequency measurements, the UE may reuse a CSI-RS configuration from the serving cell in order to perform the intra-frequency measurements. However, when the UE performs inter-frequency measurements on a CSI-RS of a non-serving cell, the UE may not reuse the CSI-RS configuration to perform the inter-frequency measurements as the non-serving cell is associated with a different frequency (e.g., a different BWP, a different CC), or a different configuration (e.g., a different SCS of a data or SSB symbol, a different center frequency) than that of the serving cell.

Various technologies pertaining to inter-frequency measurements are described herein. In an example, a UE receives a configuration to perform an inter-frequency measurement of at least one of a SSB or a CSI-RS of a candidate cell while connected to a serving cell. The UE performs the inter-frequency measurement on the at least one of the SSB or the CSI-RS from the candidate cell based on the received configuration. The UE outputs an indication of the performed inter-frequency measurement. Vis-à-vis the aforementioned configuration and inter-frequency measurement, the UE may be able to connect to the candidate cell. Furthermore, the aforementioned configuration and inter-frequency measurement may facilitate adaptation of various parameters pertaining to the UE and the candidate cell. Thus, the aforementioned technologies may provide for increased communications reliability at the UE. In one aspect, a configuration for a CSI-RS for inter-frequency measurement and a corresponding TCI are described herein. The configuration and the corresponding TCI may enable faster cell handover for inter-frequency scenarios.

Figure 10:
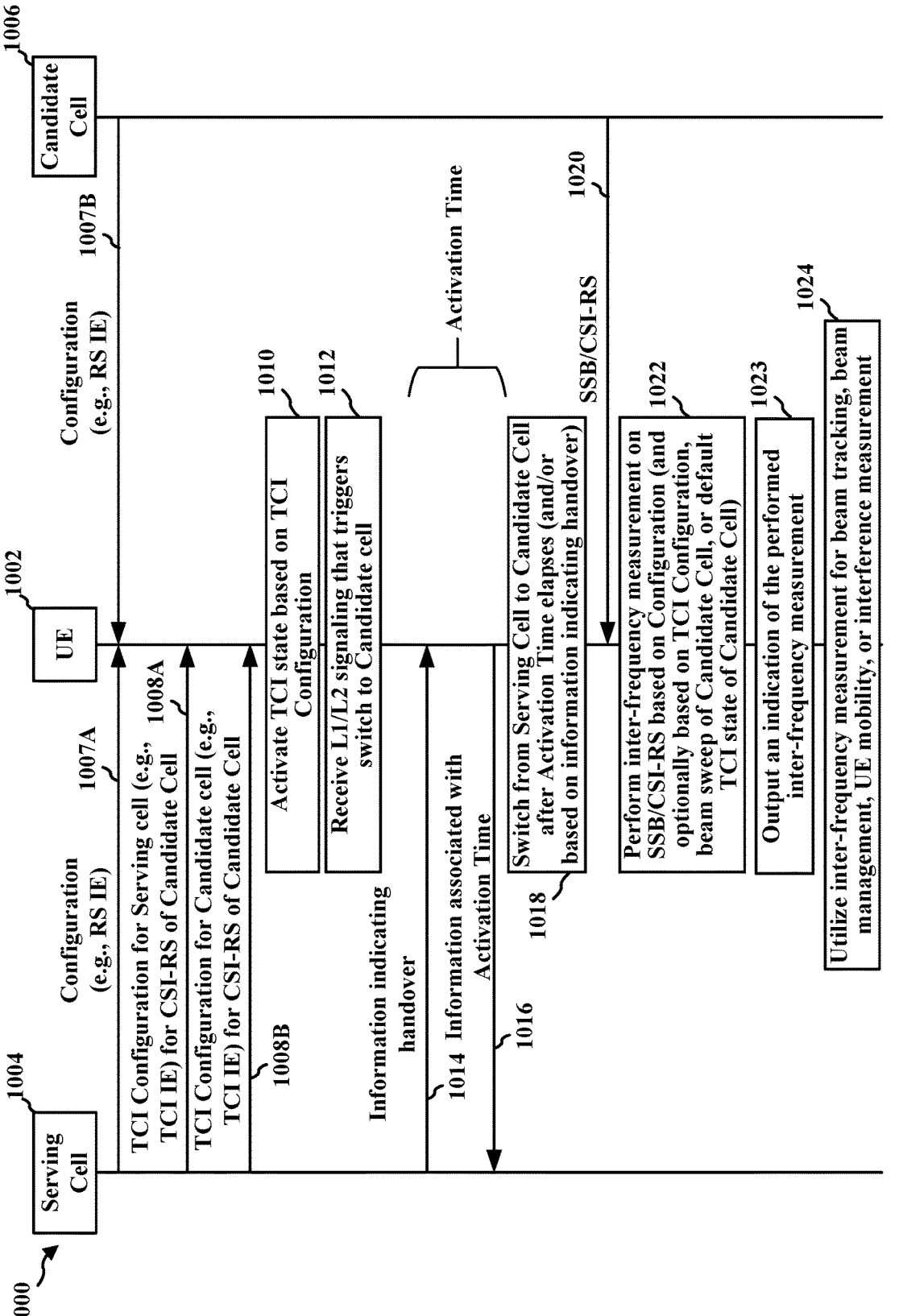
FIG. 10 is a diagram illustrating example communications between a UE, a serving cell, and a candidate cell.

FIG. 10 is a diagram 1000 illustrating example communications between a UE 1002, a serving cell 1004, and a candidate cell 1006. The communications may pertain to TCI configuration options for a CSI-RS resource for L1 inter-frequency measurements. The serving cell 1004 and the candidate cell 1006 may be associated with the same base station or a different base station. In an example, the serving cell 1004 may be associated with a first frequency for communications and the candidate cell 1006 may be associated with a second frequency for communications, where the first frequency may be different from the second frequency. The UE 1002 may be or include the UE 104, the UE 350, the UE 404, the UE 502, the UE 608, the UE 708, the UE 802, the UE 1002, or the apparatus 1304. In one aspect, the serving cell 1004 may be included in a serving CG and the candidate cell 1006 may be included in a candidate CG. The serving cell 1004 and/or the candidate cell 1006 may include aspects described above in connection with FIGS. 5 and 7.

In one aspect, at 1007A, the UE 1002 may receive a configuration to perform an inter-frequency measurement of a SSB or a CSI-RS of the candidate cell 1006 from the serving cell 1004. The configuration may also be referred to as "a reference signal configuration" or "a CSI-RS configuration." The configuration may configure inter-frequency SSB measurements and/or inter-frequency CSI-RS measurements for the candidate cell 1006. The inter-frequency measurement of the SSB/CSI-RS of the candidate cell 1006 may be a L1 inter-frequency measurement. In an example, the L1 inter-frequency measurement may be a L1 reference signal received power (RSRP) measurement. The configuration may be a reference signal (RS) information element (IE) for the serving cell 1004. For instance, the RS IE may configure inter-frequency measurements performed on a SSB and/or a CSI-RS on a per candidate cell basis.

In one aspect, at 1007B, the UE 1002 may receive a configuration to perform an inter-frequency measurement of a SSB or a CSI-RS of the candidate cell 1006 from the candidate cell 1006. The configuration may also be referred to as "a reference signal configuration" or "a CSI-RS configuration." The configuration may configure inter-frequency SSB measurements and/or inter-frequency CSI-RS measurements for the candidate cell 1006. The inter-frequency measurement of the SSB/CSI-RS of the candidate cell 1006 may be a L1 inter-frequency measurement. In an example, the L1 inter-frequency measurement may be a L1 RSRP measurement. The configuration may be a RS IE for the candidate cell 1006. For instance, the RS IE may configure inter-frequency measurements performed on a SSB and/or a CSI-RS on a per candidate cell basis.

In one aspect, at 1008A, the UE 1002 may receive a configuration to perform L1 inter-frequency measurements of a CSI-RS for a candidate cell. Further, a TCI state associated with the CSI-RS for L1 inter-frequency measurement may be further configured by a network. In one aspect, an associated TCI state may be selected from a TCI state pool configured for a current serving cell. Alternatively, the UE may be configured with a TCI state pool per candidate cell, and the TCI state associated with a L1 inter-frequency measurement of a candidate cell may be selected from a TCI pool of the candidate cell.

In one aspect, at 1008A, the UE 1002 may receive a TCI configuration from the serving cell 1004. The TCI configuration may be a TCI IE for the serving cell 1004 and the TCI configuration may be for a CSI-RS associated with the candidate cell 1006. In an example, the TCI configuration for the CSI-RS may be configured on a per candidate cell basis under a current serving cell (e.g., the serving cell 1004). In another example, the TCI configuration may be configured in a TCI pool (i.e., a TCI list) of the serving cell 1004. In an example, a TCI state associated with the TCI configuration may be defined based on a source RS, where the source RS may be a non-serving SSB (e.g., an SSB transmitted by/associated with the candidate cell 1006). In one aspect, the TCI configuration may include information pertaining to a beam on which the CSI-RS of the candidate cell 1006 is to be transmitted.

In one aspect, at 1008B, the UE 1002 may receive a TCI configuration from the serving cell 1004. The TCI configuration may be a TCI IE for the candidate cell 1006 and the TCI configuration may be for a CSI-RS associated with the candidate cell 1006. In an example, the TCI configuration for the CSI-RS may be configured under a corresponding candidate cell (e.g., the candidate cell 1006). For instance, a TCI state associated with the candidate cell 1006 may be pre-configured/activated before the UE 1002 switches to the candidate cell 1006. In another example, a TCI configuration for the CSI-RS may be configured in a TCI pool (i.e., a TCI list) of the serving cell 1004. In one aspect, the TCI configuration may include information pertaining to a beam on which the CSI-RS of the candidate cell 1006 is to be transmitted.

At 1010, the UE 1002 may activate a TCI state based on the TCI configuration received at 1008A or 1008B. Activating the TCI state may include aspects described above in connection with FIGS. 4 and 8. At 1012, the UE 1002 may receive L1 signaling (e.g., a DCI) or L2 signaling (e.g., a MAC-CE) that triggers the UE 1002 to switch to the candidate cell 1006. In an example, the UE 1002 may receive the L1 or L2 signaling from the serving cell 1004. At 1014, the UE 1002 may receive information from the serving cell 1004 indicating that the UE 1002 is to prepare for a handover (or a potential handover) to the candidate cell 1006 (or a cell group that includes the candidate cell 1006).

At 1016, the UE 1002 may transmit information associated with an activation time (which may also be referred to as "an application time") at the UE 1002 to the serving cell 1004. The activation time may refer to a time between the UE 1002 receiving a cell switch command and the UE 1002 switching to a new cell (e.g., the candidate cell 1006). The UE 1002 may transmit the information associated with the activation time due to the UE 1002 changing one or more configuration parameters from the serving cell 1004 to the candidate cell 1006. In an example, the one or more configuration parameters may be a change for a CC. The one or more parameters may include a baseband configuration change (e.g., a change in a configuration for a PDCCH, a PDSCH, a PUCCH, or a PUSCH) or a radio frequency (RF) configuration change. The RF configuration change may include one or more of an addition or removal of a cell or a cell group, an activation or a deactivation of a cell or a cell group, a change in bandwidth or a change in center frequency of a reference signal, a change in a number of Tx and/or Rx spatial layers, and/or a change in a DL and/or UL CA configuration. In one example, the activation time may be relatively longer if a configuration/parameter of the CC has changed. In another example, the activation time may be relatively shorter if a configuration/parameter of the CC remains the same, such as a swap between an SCell and a PCell (as in the first example 702) or a cell group switch (i.e., a first cell group being switched with a second cell group, where the first cell group and the second cell group have identical configurations).

In one aspect, the information associated with the activation time transmitted at 1016 may indicate that the UE 1002 is capable of supporting a relatively shorter activation time if a configuration and/or a parameter (e.g., an operation parameter) of a CC has changed. For instance, the information associated with the activation time transmitted at 1016 may include indications of a number of candidate cell(s) and/or candidate cell group(s). In an example, the UE 1002 may utilize additional Tx/Rx chains for the candidate cell(s) and/or the candidate cell group(s). In one aspect, the information received by the UE 1002 at 1014 may indicate that the UE 1002 is to prepare for a relatively shorter activation time.

At 1018, the UE 1002 may switch from the serving cell 1004 to the candidate cell 1006. In one aspect, the UE 1002 may switch after the activation time at the UE 1002 elapses. In one aspect, the UE 1002 may switch based on the information indicating handover received at 1014.

At 1020, the candidate cell 1006 may transmit a SSB and/or a CSI-RS. At 1022, the UE 1002 may perform an inter-frequency measurement on the SSB/CSI-RS associated with the candidate cell 1006 based on the configuration received at 1007A or 1007B. At 1023, the UE 1002 may output an indication of the performed inter-frequency measurement. In one aspect, the inter-frequency measurement may also be performed on the SSB/CSI-RS associated with the candidate cell 1006 based on the TCI configuration received at 1008A or 1008B. In an example, a CSI-RS associated with the serving cell 1004 may not have a corresponding TCI configuration. In one option with respect to the example, the UE 1002 may perform a P1 beam refinement procedure (e.g., the P1 beam refinement procedure 602) and/or a P2 beam refinement procedure (e.g., the P2 beam refinement procedure 604) to determine Rx beams to receive a CSI-RS of the candidate cell 1006. Stated differently, the UE 1002 may perform a beam sweep. For instance, the UE 1002 may perform the beam sweep on a CSI-RS for the candidate cell to determine a beam direction and the UE 1002 may later perform an inter-frequency measurement using the beam direction. In another option with respect to the example, the UE 1002 may follow a default rule. For instance, the UE 1002 may follow an indicated TCI state for the candidate cell 1006 or a TCI state for a physical cell ID (PCI). The default rule may be applicable for a CSI-RS, a CSI, or a tracking reference signal (TRS).

At 1024, the UE 1002 may utilize the inter-frequency measurement for beam tracking purposes (i.e., CSI-RS for tracking), beam management purposes, UE mobility purposes (i.e., CSI and mobility), or interference measurements (i.e., channel state information interference measurements (CSI-IM)). For instance, the beam tracking purposes, the beam management purposes, the UE mobility purposes, and/or the interference measurements may be associated with L1 intra-frequency and L1 inter-frequency aspects of the UE 1002. In one example, the UE 1002 may transmit the inter-frequency measurement to the serving cell 1004 and/or the candidate cell 1006. Additionally or alternatively, intra-frequency measurements may be used for the aforementioned purposes.

In one aspect, the TCI configuration (e.g., the TCI configuration received at 1008A or 1008B) may indicate a source RS and a target RS for TCI purposes. The source RS may be a RS that was used to define a TCI state in a RRC configuration, for instance a SSB and/or a CSI-RS (e.g., a SSB or a CSI-RS associated with a non-serving cell). The target RS (or a target channel) may be scheduled by a base station (e.g., a gNB) on a PDSCH on the TCI state. In one aspect, the source RS may be a SSB for a candidate cell and the target RS may be CSI-RS for the candidate cell. In an example, if a UE performs an inter-frequency measurement on a CSI-RS (e.g., such as the inter-frequency measurement performed at 1022), the UE may utilize the same spatial filter (e.g., the same beam) as a spatial filter used for measuring the SSB.

FIG. 11 is a flowchart 1100 of a method of wireless communication. The method may be performed by a UE (e.g., the UE 104, the UE 350, the UE 404, the UE 502, the UE 608, the UE 708, the UE 802, the UE 1002, the apparatus 1304). The method may be associated with various advantages at the UE. For instance, the method may facilitate switching of a UE from a serving cell to a candidate cell. The method may facilitate increased communications reliability at the UE. In an example, the method may be performed by the measurement component 198.

At 1102, the UE receives a configuration to perform an inter-frequency measurement of at least one of a SSB or a CSI-RS of a candidate cell while connected to a serving cell. For example, FIG. 10 at 1007A/1007B shows that the UE 1002 may receive a configuration to perform an inter-frequency measurement. The UE 1002 may be connected to the serving cell 1004 when the UE 1002 receives the configuration at 1007A/1007B. In an example, the candidate cell may be the candidate cell 1006 and the SSB or the CSI-RS may be the SSB/CSI-RS depicted in FIG. 10. In an example, 1102 may be performed by the measurement component 198.

At 1104, the UE performs the inter-frequency measurement on the at least one of the SSB or the CSI-RS from the candidate cell based on the received configuration. For example, FIG. 10 at 1022 shows that the UE 1002 may perform an inter-frequency measurement on a SSB/CSI-RS from the candidate cell 1006 based on the configuration received at 1007A/1007B. The at least one of the SSB or the CSI-RS may be the SSB/CSI-RS transmitted at 1020. In an example, 1104 may be performed by the measurement component 198.

At 1106, the UE outputs an indication of the performed inter-frequency measurement. For example, FIG. 10 at 1023 shows that the UE 1002 may output an indication of the performed inter-frequency measurement. In an example, 1106 may be performed by the measurement component 198.

FIG. 12 is a flowchart 1200 of a method of wireless communication. The method may be performed by a UE (e.g., the UE 104, the UE 350, the UE 404, the UE 502, the UE 608, the UE 708, the UE 802, the UE 1002, the apparatus 1304). The method may be associated with various advantages at the UE. For instance, the method may facilitate switching of a UE from a serving cell to a candidate cell. The method may facilitate increased communications reliability at the UE. In an example, the method (including the various aspects detailed below) may be performed by the measurement component 198.

At 1202, the UE receives a configuration to perform an inter-frequency measurement of at least one of a SSB or a CSI-RS of a candidate cell while connected to a serving cell. For example, FIG. 10 at 1007A/1007B shows that the UE 1002 may receive a configuration to perform an inter-frequency measurement. The UE 1002 may be connected to the serving cell 1004 when the UE 1002 receives the configuration at 1007A/1007B. In an example, the candidate cell may be the candidate cell 1006 and the SSB or the CSI-RS may be the SSB/CSI-RS depicted in FIG. 10. In an example, 1202 may be performed by the measurement component 198.

At 1218, the UE performs the inter-frequency measurement on the at least one of the SSB or the CSI-RS from the candidate cell based on the received configuration. For example, FIG. 10 at 1022 shows that the UE 1002 may perform an inter-frequency measurement on a SSB/CSI-RS from the candidate cell 1006 based on the configuration received at 1007A/1007B. The at least one of the SSB or the CSI-RS may be the SSB/CSI-RS transmitted at 1020. In an example, 1218 may be performed by the measurement component 198.

At 1220, the UE outputs an indication of the performed inter-frequency measurement. For example, FIG. 10 at 1023 shows that the UE 1002 may output an indication of the performed inter-frequency measurement. In an example, 1220 may be performed by the measurement component 198.

In one aspect, the configuration may be received from the serving cell. For example, FIG. 10 at 1007A shows that the configuration may be received from the serving cell 1004.

In one aspect, the configuration may be received from the candidate cell. For example, FIG. 10 at 1007B shows that the configuration may be received from the candidate cell 1006.

In one aspect, the configuration may be a RS IE for the serving cell. For example, FIG. 10 at 1007A shows that the configuration may be a RS IE for the serving cell 1004.

In one aspect, at 1204, the UE may receive a TCI configuration from the serving cell, where the TCI configuration may be a TCI IE for the serving cell, where the TCI configuration may be for the CSI-RS from the candidate cell, where the inter-frequency measurement may be performed further based on the received TCI configuration for the CSI-RS. For example, FIG. 10 at 1008A shows that the UE 1002 may receive a TCI configuration from the serving cell 1004. FIG. 10 at 1008A also shows that the TCI configuration may be a TCI IE for the serving cell 1004 and that the TCI configuration may be for a CSI-RS from the candidate cell 1006 (e.g., the CSI-RS transmitted at 1020). In another example, FIG. 10 at 1022 shows that the inter-frequency measurement may be performed based on the TCI configuration received at 1008A. In an example, 1204 may be performed by the measurement component 198.

In one aspect, the configuration may be a RS IE for the candidate cell. For example, FIG. 10 at 1007B shows that the configuration may be a RS IE for the candidate cell 1006.

In one aspect, at 1206, the UE may receive a TCI configuration from the serving cell, where the TCI configuration may be a TCI IE for the candidate cell, where the TCI configuration may be for the CSI-RS from the candidate cell, where the inter-frequency measurement may be performed further based on the received TCI configuration for the CSI-RS. For example, FIG. 10 at 1008B shows that the UE 1002 may receive a TCI configuration from the serving cell 1004. FIG. 10 at 1008B also shows that the TCI configuration may be a TCI IE for the candidate cell 1006 and that the TCI configuration may be for a CSI-RS from the candidate cell 1006 (e.g., the CSI-RS transmitted at 1020). In another example, FIG. 10 at 1022 shows that the inter-frequency measurement may be performed based on the TCI configuration received at 1008B. In an example, 1206 may be performed by the measurement component 198.

In one aspect, at 1208, the UE may activate a TCI state associated with the received TCI configuration before switching to the candidate cell to perform the inter-frequency measurement on the CSI-RS from the candidate cell. For example, FIG. 10 at 1010 shows that the UE 1002 may activate a TCI state associated with the TCI configuration received at 1008A or 1008B. Furthermore, FIG. 10 also shows that the activation of the TCI state at 1010 may occur before the UE 1002 switches to the serving cell at 1018 to perform the inter-frequency measurement on the CSI-RS of the candidate cell at 1022. In another example, activating the TCI state associated with the received TCI configuration may include aspects described above in the description of FIG. 4. In an example, 1208 may be performed by the measurement component 198.

In one aspect, the inter-frequency measurement for the CSI-RS may be associated with one of beam tracking, beam management, UE mobility, or an interference measurement. For example, FIG. 10 at 1024 shows that the inter-frequency measurement may be used for beam tracking purposes, beam management purposes, UE mobility purposes, and/or interference measurement purposes.

In one aspect, at 1210, the UE may receive at least one of L1 signaling or L2 signaling that triggers a cell switch to at least the candidate cell. For example, FIG. 10 at 1012 shows that the UE 1002 may receive L1/L2 signaling that triggers a cell switch to the candidate cell 1006. In an example, 1210 may be performed by the measurement component 198.

In one aspect, at 1216, the UE may switch from the serving cell to at least the candidate cell after an activation time to perform the inter-frequency measurement, where the activation time may be based on whether one or more configuration parameters associated with the candidate cell are identical to one or more configuration parameters associated with the serving cell. For example, FIG. 10 shows that the UE 1002 may switch from the serving cell 1004 to the candidate cell 1006 at 1018 after an activation time elapses, where the activation time may be based on whether one or more configuration parameters associated with the candidate cell 1006 are identical to one or more configuration parameters associated with the serving cell 1004. In an example, 1216 may be performed by the measurement component 198.

In one aspect, at 1212, the UE may transmit, to the serving cell, information associated with the activation time at the UE due to a change of the one or more configuration parameters from the serving cell to the candidate cell. For example, FIG. 10 at 1016 shows that the UE 1002 may transmit information associated with the activation time to the serving cell 1004 due to a change of one or more configuration parameters from the serving cell 1004 to the candidate cell 1006. In an example, 1212 may be performed by the measurement component 198.

In one aspect, at 1214, the UE may receive information from the serving cell that indicates that the UE is to prepare for a handover to the candidate cell to perform the inter-frequency measurement, where the switch from the serving cell to at least the candidate cell may be performed based on the received information. For example, FIG. 10 at 1014 shows that the UE 1002 may receive information that indicates that the UE 1002 is to prepare for a handover to the candidate cell 1006 to perform the inter-frequency measurement. Furthermore, FIG. 10 at 1018 shows that the switch from the serving cell 1004 to the candidate cell 1006 may be based on the information received at 1014. In an example, 1214 may be performed by the measurement component 198.

In one aspect, the inter-frequency measurement may be performed without utilization of a TCI configuration. For example, FIG. 10 at 1022 shows that the UE 1002 may perform the inter-frequency measurement on the SSB/CSI-RS without utilization of a TCI configuration.

In one aspect, the inter-frequency measurement may be performed based on a beam sweep at the candidate cell. For example, FIG. 10 at 1022 shows that the UE 1002 may perform the inter-frequency measurement based on a beam sweep at the candidate cell 1006.

In one aspect, the inter-frequency measurement may be performed based on a default TCI state in the candidate cell. For example, FIG. 10 at 1022 shows that the UE 1002 may perform the inter-frequency measurement based on a default TCI state of the candidate cell 1006.

Figure 13:
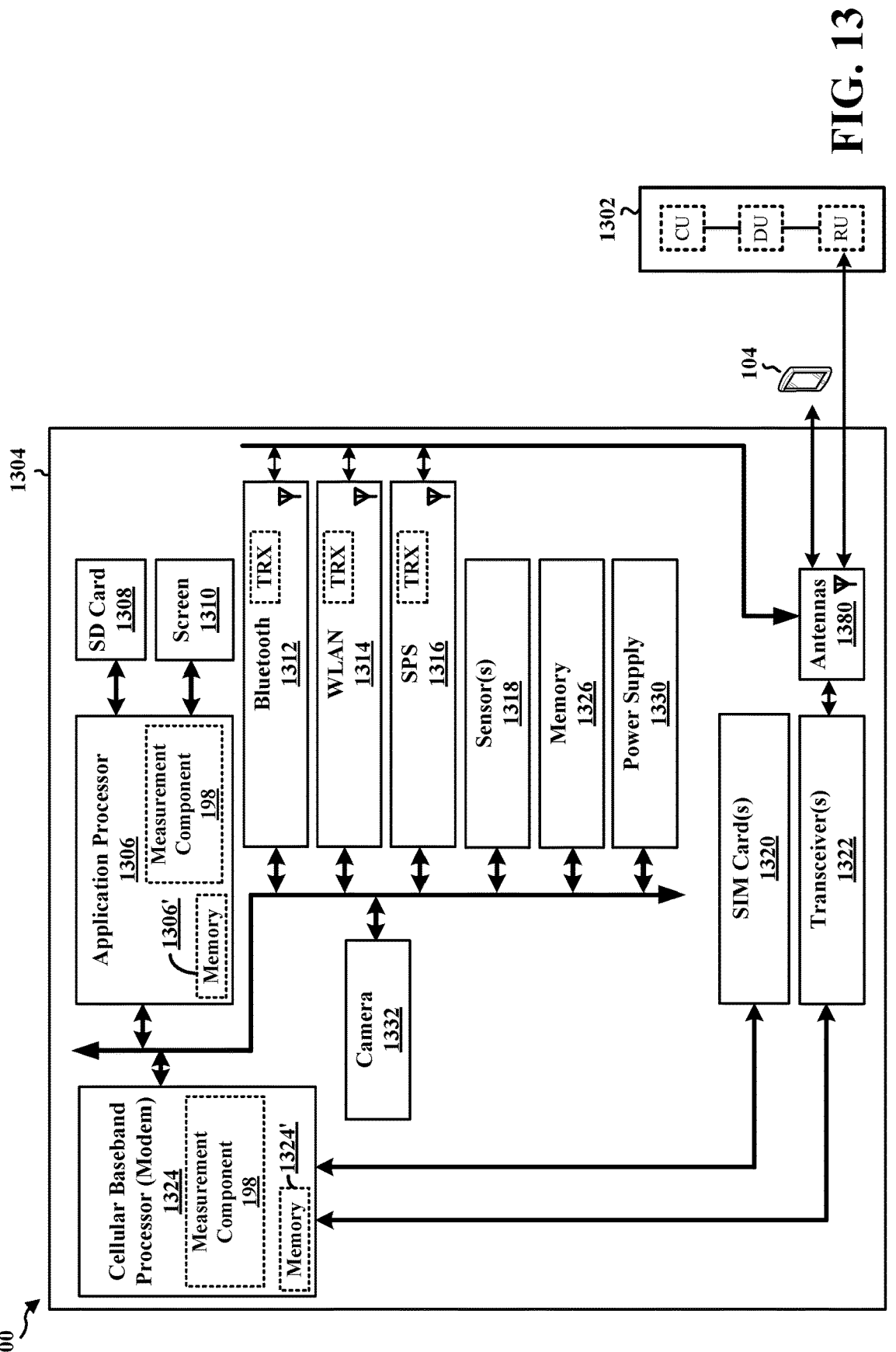
FIG. 13 is a diagram illustrating an example of a hardware implementation for an example apparatus.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/ memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the measurement component 198 is configured to receive a configuration to perform an inter-frequency measurement of at least one of a synchronization signal block (SSB) or channel state information (CSI) reference signals (RS) (CSI-RS) of a candidate cell while connected to a serving cell. The measurement component 198 is configured to perform the inter-frequency measurement on the at least one of the SSB or the CSI-RS from the candidate cell based on the received configuration. The measurement component 198 is configured output an indication of the performed inter-frequency measurement. The measurement component 198 is configured to receive a transmission configuration indicator (TCI) configuration from the serving cell, where the TCI configuration is a TCI information element (IE) for the serving cell, the TCI configuration being for the CSI-RS from the candidate cell, where the inter-frequency measurement is performed further based on the received TCI configuration for the CSI-RS. The measurement component 198 is configured to receive a transmission configuration indicator (TCI) configuration from the serving cell, where the TCI configuration is a TCI information element (IE) for the candidate cell, the TCI configuration being for the CSI-RS from the candidate cell, where the inter-frequency measurement is performed further based on the received TCI configuration for the CSI-RS. The measurement component 198 is configured to activate a TCI state associated with the received TCI configuration before a switch to the candidate cell to perform the inter-frequency measurement on the CSI-RS from the candidate cell. The measurement component 198 is configured to receive at least one of layer 1 (L1) signaling or layer 2 (L2) signaling that triggers a cell switch to at least the candidate cell. The measurement component 198 is configured to switch from the serving cell to at least the candidate cell after an activation time to perform the inter-frequency measurement, the activation time being based on whether one or more configuration parameters associated with the candidate cell are identical to one or more configuration parameters associated with the serving cell. The measurement component 198 is configured to transmit, to the serving cell, information associated with the activation time at the UE due to a change of the one or more configuration parameters from the serving cell to the candidate cell. The measurement component 198 is configured to receive information from the serving cell that indicates that the UE is to prepare for a handover to the candidate cell to perform the inter-frequency measurement, where the switch from the serving cell to at least the candidate cell is performed based on the received information. The measurement component 198 may be within the cellular baseband processor 1324, the application processor 1306, or both the cellular baseband processor 1324 and the application processor 1306. The measurement component 198 may be one or more hardware components specifically configured to carry out the stated processes/ algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving a configuration to perform an inter-frequency measurement of at least one of a synchronization signal block (SSB) or a channel state information (CSI) reference signal (RS) (CSI-RS) of a candidate cell while connected to a serving cell. In one configuration, the apparatus 1304, and in particular the cellular baseband processor 1324 and/or the application processor 1306, includes means for performing the inter-frequency measurement on the at least one of the SSB or the CSI-RS from the candidate cell based on the received configuration. In one configuration, the apparatus 1304, and in particular the cellular baseband processor 1324 and/or the application processor 1306, includes means for outputting an indication of the performed inter-frequency measurement. In one configuration, the apparatus 1304, and in particular the cellular baseband processor 1324 and/or the application processor 1306, includes means for receiving a transmission configuration indicator (TCI) configuration from the serving cell, where the TCI configuration is a TCI information element (IE) for the serving cell, the TCI configuration being for the CSI-RS from the candidate cell, where the inter-frequency measurement is performed further based on the received TCI configuration for the CSI-RS. In one configuration, the apparatus 1304, and in particular the cellular baseband processor 1324 and/or the application processor 1306, includes means for receiving a transmission configuration indicator (TCI) configuration from the serving cell, where the TCI configuration is a TCI information element (IE) for the candidate cell, the TCI configuration being for the CSI-RS from the candidate cell, where the inter-frequency measurement is performed further based on the received TCI configuration for the CSI-RS. In one configuration, the apparatus 1304, and in particular the cellular baseband processor 1324 and/or the application processor 1306, includes means for activating a TCI state associated with the received TCI configuration before switching to the candidate cell to perform the inter-frequency measurement on the CSI-RS from the candidate cell. In one configuration, the apparatus 1304, and in particular the cellular baseband processor 1324 and/or the application processor 1306, includes means for receiving at least one of layer 1 (L1) signaling or layer 2 (L2) signaling triggering a cell switch to at least the candidate cell. In one configuration, the apparatus 1304, and in particular the cellular baseband processor

1324 and/or the application processor 1306, includes means for switching from the serving cell to at least the candidate cell after an activation time to perform the inter-frequency measurement, the activation time being based on whether one or more configuration parameters associated with the candidate cell are identical to one or more configuration parameters associated with the serving cell. In one configuration, the apparatus 1304, and in particular the cellular baseband processor 1324 and/or the application processor 1306, includes means for transmitting, to the serving cell, information associated with the activation time at the UE due to changing the one or more configuration parameters from the serving cell to the candidate cell. In one configuration, the apparatus 1304, and in particular the cellular baseband processor 1324 and/or the application processor 1306, includes means for receiving information from the serving cell indicating for the UE to prepare for a handover to the candidate cell for performing the inter-frequency measurement, where the switching from the serving cell to at least the candidate cell is performed based on the received information. The means may be the measurement component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
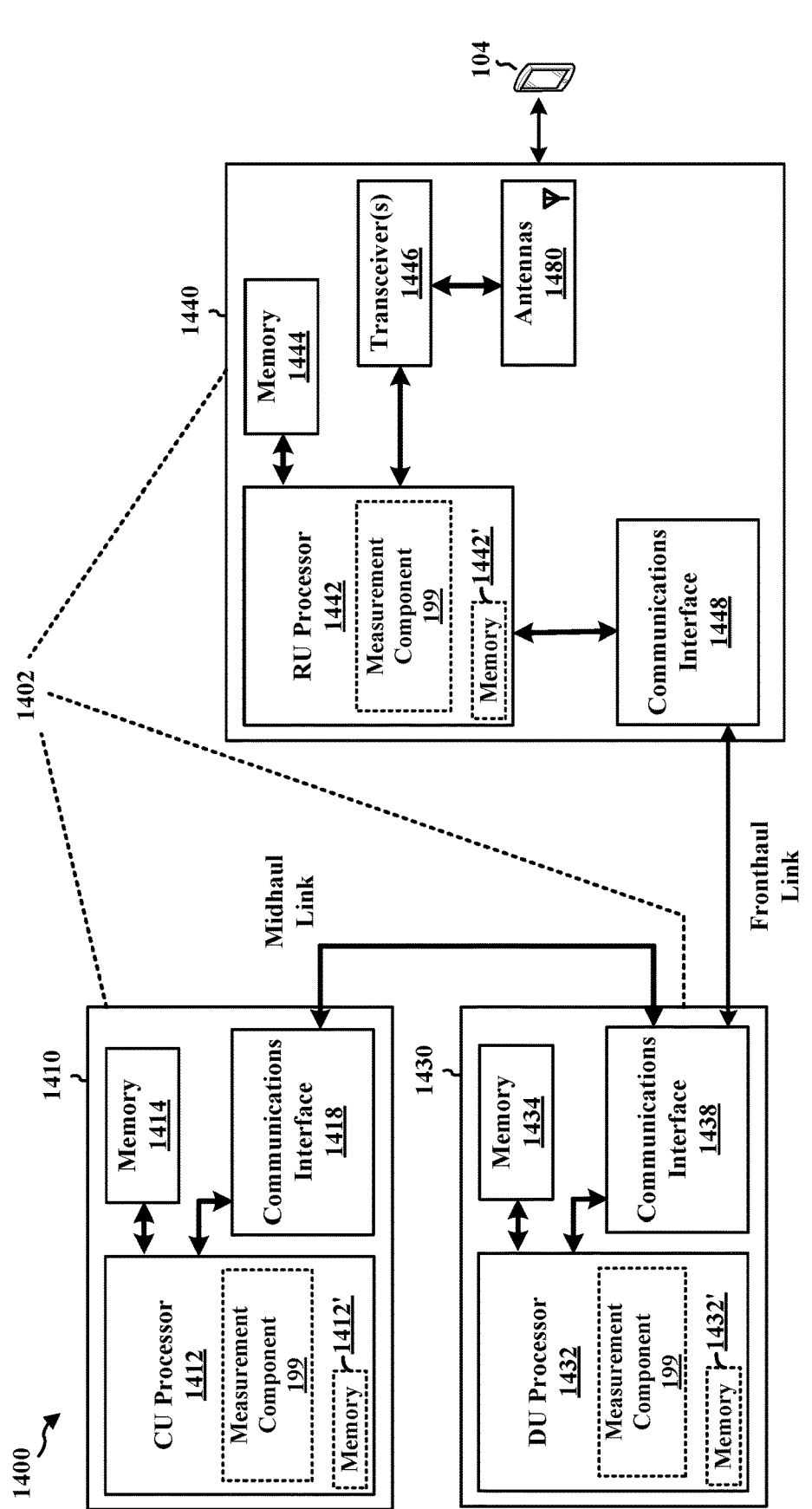
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the measurement component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the measurement component 199 is configured to perform functionality described herein as being performed by a base station, a network node, a network entity, etc. The measurement component 199 may be within one or more processors of one or more of the CU 1410, DU 1430, and the RU 1440. The measurement component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for performing functionality described herein as being performed by a base station, a network node, a network entity, etc. The means may be the measurement component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

A UE may be connected to a serving cell in order to communicate via a wireless communication network. As the UE moves about an environment, the UE may change serving cells (i.e., change from a serving cell to a candidate cell) in order to maintain communications reliability. In order to determine when to switch to the candidate cell (and/or to adjust parameters of the UE with respect to the candidate cell), the UE may perform measurements on a reference signal (e.g., a synchronization signal block (SSB) or a channel state information reference signal (CSI-RS)) associated with the candidate cell. When the UE performs intra-frequency measurements, the UE may reuse a CSI-RS configuration from the serving cell. However, when the UE performs inter-frequency measurements, the UE may not reuse the CSI-RS configuration due to the serving cell and the non-serving cell being associated with different frequencies.

Various technologies pertaining to inter-frequency measurements are described herein. In an example, a UE receives a configuration to perform an inter-frequency measurement of at least one of a SSB or a CSI-RS of a candidate cell while connected to a serving cell. The UE performs the inter-frequency measurement on the at least one of the SSB or the CSI-RS from the candidate cell based on the received configuration. The UE outputs an indication of the performed inter-frequency measurement. Vis-à-vis the aforementioned configuration and inter-frequency measurement, the UE may be able to connect to the candidate cell. Furthermore, the aforementioned configuration and inter-frequency measurement may facilitate adaptation of various parameters pertaining to the UE and the candidate cell. Thus, the aforementioned technologies may provide for increased communications reliability at the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving a configuration to perform an inter-frequency measurement of at least one of a synchronization signal block (SSB) or a channel state information (CSI) reference signal (RS) (CSI-RS) of a candidate cell while connected to a serving cell; performing the inter-frequency measurement on the at least one of the SSB or the CSI-RS from the candidate cell based on the received configuration; and outputting an indication of the performed inter-frequency measurement.

Aspect 2 is the method of aspect 1, where the configuration is received from the serving cell.

Aspect 3 is the method of aspect 1, where the configuration is received from the candidate cell.

Aspect 4 is the method of any of aspects 1-2, where the configuration is a RS information element (IE) for the serving cell.

Aspect 5 is the method of any of aspects 1-4, further including: receiving a transmission configuration indicator (TCI) configuration from the serving cell, where the TCI configuration is a TCI information element (IE) for the serving cell, the TCI configuration being for the CSI-RS from the candidate cell, where the inter-frequency measurement is performed further based on the received TCI configuration for the CSI-RS.

Aspect 6 is the method of any of aspects 1, 3, or 5, where the configuration is a RS information element (IE) for the candidate cell.

Aspect 7 is the method of any of aspects 1-4 and 6, further including: receiving a transmission configuration indicator (TCI) configuration from the serving cell, where the TCI configuration is a TCI information element (IE) for the candidate cell, the TCI configuration being for the CSI-RS from the candidate cell, where the inter-frequency measurement is performed further based on the received TCI configuration for the CSI-RS.

Aspect 8 is the method of aspect 7, further including: activating a TCI state associated with the received TCI configuration before switching to the candidate cell to perform the inter-frequency measurement on the CSI-RS from the candidate cell.

Aspect 9 is the method of any of aspects 1-8, where the inter-frequency measurement for the CSI-RS is associated with one of beam tracking, beam management, UE mobility, or an interference measurement.

Aspect 10 is the method of any of aspects 1-9, further including: receiving at least one of layer 1 (L1) signaling or layer 2 (L2) signaling triggering a cell switch to at least the candidate cell; and switching from the serving cell to at least the candidate cell after an activation time to perform the inter-frequency measurement, the activation time being based on whether one or more configuration parameters associated with the candidate cell are identical to one or more configuration parameters associated with the serving cell.

Aspect 11 is the method of aspect 10, further including: transmitting, to the serving cell, information associated with the activation time at the UE due to changing the one or more configuration parameters from the serving cell to the candidate cell.

Aspect 12 is the method of any of aspects 10-11, further including: receiving information from the serving cell indicating for the UE to prepare for a handover to the candidate cell for performing the inter-frequency measurement, where the switching from the serving cell to at least the candidate cell is performed based on the received information.

Aspect 13 is the method of any of aspects 1-12, where the inter-frequency measurement is performed without using a transmission configuration indicator (TCI) configuration.

Aspect 14 is the method of aspect 13, where the inter-frequency measurement is performed based on a beam sweep at the candidate cell.

Aspect 15 is the method of any of aspects 1-13, where the inter-frequency measurement is performed based on a default transmission configuration indicator (TCI) state in the candidate cell.

Aspect 16 is an apparatus for wireless communication at a UE including at least one memory and at least one processor coupled to the at least one memory and based at least in part on information stored in the at least one memory, the at least one processor, individually or in any combination, is configured to perform a method in accordance with any of aspects 1-15.

Aspect 17 is an apparatus for wireless communications, including means for performing a method in accordance with any of aspects 1-15.

Aspect 18 is the apparatus of aspect 16 or 17 further including at least one of a transceiver or an antenna coupled to the at least one processor, where to receive the configuration, the at least one processor, individually or in any combination, is configured to receive the configuration via at least one of the transceiver or the antenna.

Aspect 19 is a computer-readable medium (e.g., a non-transitory computer-readable medium) storing computer executable code, the computer executable code, when executed by at least one processor, causes the at least one processor to perform a method in accordance with any of aspects 1-15.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

receive, from a serving cell, a configuration to perform an inter-frequency measurement of at least one of a synchronization signal block (SSB) or a channel state information (CSI) reference signal (RS) (CSI-RS) of a candidate cell while connected to the serving cell;

perform, for the candidate cell, the inter-frequency measurement on the at least one of the SSB or the CSI-RS from the candidate cell based on the received configuration; and output an indication of the performed inter-frequency measurement.

2. The apparatus of claim 1, wherein the configuration is an RS information element (IE) for the serving cell.

3. The apparatus of claim 1, wherein the at least one processor is further configured to:

receive a transmission configuration indicator (TCI) configuration from the serving cell, wherein the TCI configuration is a TCI information element (IE) for the serving cell, the TCI configuration being for the CSI-RS from the candidate cell, wherein to perform the inter-frequency measurement, the at least one processor is configured to perform the inter-frequency measurement further based on the received TCI configuration for the CSI-RS.

4. The apparatus of claim 1, wherein the configuration is an RS information element (IE) for the candidate cell.

5. The apparatus of claim 1, wherein the at least one processor is further configured to:

receive a transmission configuration indicator (TCI) configuration from the serving cell, wherein the TCI configuration is a TCI information element (IE) for the candidate cell, the TCI configuration being for the CSI-RS from the candidate cell, wherein to perform the inter-frequency measurement, the at least one processor is configured to perform the inter-frequency measurement further based on the received TCI configuration for the CSI-RS.

6. The apparatus of claim 5, wherein the at least one processor is further configured to:

activate a TCI state associated with the received TCI configuration before a switch to the candidate cell to perform the inter-frequency measurement on the CSI-RS from the candidate cell.

7. The apparatus of claim 1, wherein the inter-frequency measurement for the CSI-RS is associated with one of beam tracking, beam management, UE mobility, or an interference measurement.

8. The apparatus of claim 1, wherein the at least one processor is further configured to:

receive at least one of layer 1 (L1) signaling or layer 2 (L2) signaling that is configured to trigger a cell switch to at least the candidate cell; and switch from the serving cell to at least the candidate cell after an activation time to perform the inter-frequency measurement, the activation time being based on whether one or more configuration parameters associated with the candidate cell are identical to one or more configuration parameters associated with the serving cell.

9. The apparatus of claim 8, wherein the at least one processor is further configured to:

transmit, to the serving cell, information associated with the activation time at the UE due to a change of the one or more configuration parameters from the serving cell to the candidate cell.

10. The apparatus of claim 8, wherein the at least one processor is further configured to:

receive information from the serving cell that indicates that the UE is to prepare for a handover to the candidate cell to perform the inter-frequency measurement, wherein the at least one processor is configured to switch from the serving cell to at least the candidate cell based on the received information.

11. The apparatus of claim 1, wherein to perform the inter-frequency measurement, the at least one processor is configured to perform the inter-frequency measurement without utilization of a transmission configuration indicator (TCI) configuration.

12. The apparatus of claim 11, wherein to perform the inter-frequency measurement, the at least one processor is configured to perform the inter-frequency measurement based on a beam sweep at the candidate cell.

13. The apparatus of claim 1, wherein to perform the inter-frequency measurement, the at least one processor is configured to perform the inter-frequency measurement based on a default transmission configuration indicator (TCI) state in the candidate cell.

14. The apparatus of claim 1, further comprising: at least one of a transceiver or an antenna coupled to the at least one processor, wherein to receive the configuration, the at least one processor is configured to receive the configuration via at least one of the transceiver or the antenna.

15. A method of wireless communication at a user equipment (UE), comprising:

receiving, from a serving cell, a configuration to perform an inter-frequency measurement of at least one of a synchronization signal block (SSB) or a channel state information (CSI) reference signal (RS) (CSI-RS) of a candidate cell while connected to the serving cell;

performing, for the candidate cell, the inter-frequency measurement on the at least one of the SSB or the CSI-RS from the candidate cell based on the received configuration; and outputting an indication of the performed inter-frequency measurement.

16. The method of claim 15, wherein the configuration is a RS information element (IE) for the serving cell.

17. The method of claim 15, further comprising:
receiving a transmission configuration indicator (TCI) configuration from the serving cell, wherein the TCI configuration is a TCI information element (IE) for the serving cell, the TCI configuration being for the CSI-RS from the candidate cell, wherein the inter-frequency measurement is performed further based on the received TCI configuration for the CSI-RS.

18. The method of claim 15, wherein the configuration is a RS information element (IE) for the candidate cell.

19. The method of claim 15, further comprising:
receiving a transmission configuration indicator (TCI) configuration from the serving cell, wherein the TCI configuration is a TCI information element (IE) for the candidate cell, the TCI configuration being for the CSI-RS from the candidate cell, wherein the inter-frequency measurement is performed further based on the received TCI configuration for the CSI-RS.

20. The method of claim 19, further comprising:
activating a TCI state associated with the received TCI configuration before switching to the candidate cell to perform the inter-frequency measurement on the CSI-RS from the candidate cell.

21. The method of claim 15, wherein the inter-frequency measurement for the CSI-RS is associated with one of beam tracking, beam management, UE mobility, or an interference measurement.

22. The method of claim 15, further comprising:
receiving at least one of layer 1 (L1) signaling or layer 2 (L2) signaling triggering a cell switch to at least the candidate cell; and switching from the serving cell to at least the candidate cell after an activation time to perform the inter-frequency measurement, the activation time being based on whether one or more configuration parameters associated with the candidate cell are identical to one or more configuration parameters associated with the serving cell.

23. The method of claim 22, further comprising:
transmitting, to the serving cell, information associated with the activation time at the UE due to changing the one or more configuration parameters from the serving cell to the candidate cell.

24. The method of claim 22, further comprising:
receiving information from the serving cell indicating for the UE to prepare for a handover to the candidate cell for performing the inter-frequency measurement, wherein the switching from the serving cell to at least the candidate cell is performed based on the received information.

25. An apparatus for wireless communication at a user equipment (UE), comprising:
means for receiving, from a serving cell, a configuration to perform an inter-frequency measurement of at least one of a synchronization signal block (SSB) or a channel state information (CSI) reference signal (RS) (CSI-RS) of a candidate cell while connected to the serving cell;

means for performing, for the candidate cell, the inter-frequency measurement on the at least one of the SSB or the CSI-RS from the candidate cell based on the received configuration; and means for outputting an indication of the performed inter-frequency measurement.

26. A non-transitory computer-readable medium storing computer executable code at a user equipment (UE), the computer executable code, when executed by at least one processor, causes the at least one processor to:
receive, from a serving cell, a configuration to perform an inter-frequency measurement of at least one of a synchronization signal block (SSB) or a channel state information (CSI) reference signal (RS) (CSI-RS) of a candidate cell while connected to the serving cell;

perform, for the candidate cell, the inter-frequency measurement on the at least one of the SSB or the CSI-RS from the candidate cell based on the received configuration; and output an indication of the performed inter-frequency measurement.

* * * * *